(12) United States Patent
Andhe

(10) Patent No.: US 12,244,495 B2
(45) Date of Patent: Mar. 4, 2025

(54) METHOD AND APPARATUS FOR LAYER 2 ROUTE CALCULATION IN A ROUTE REFLECTOR NETWORK DEVICE

(71) Applicant: TELEFONAKTIEBOLAGET LM ERICSSON (PUBL), Stockholm (SE)

(72) Inventor: Chalapathi Andhe, Bangalore (IN)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 379 days.

(21) Appl. No.: 17/605,582

(22) PCT Filed: May 15, 2019

(86) PCT No.: PCT/IN2019/050387
§ 371 (c)(1),
(2) Date: Nov. 11, 2021

(87) PCT Pub. No.: WO2020/230146
PCT Pub. Date: Nov. 19, 2020

(65) Prior Publication Data
US 2022/0247679 A1 Aug. 4, 2022

(51) Int. Cl.
*H04L 45/00* (2022.01)
*H04L 45/02* (2022.01)
(Continued)

(52) U.S. Cl.
CPC ............. *H04L 45/66* (2013.01); *H04L 45/02* (2013.01); *H04L 45/50* (2013.01); *H04L 47/34* (2013.01)

(58) Field of Classification Search
CPC ......... H04L 45/66; H04L 45/02; H04L 45/50; H04L 47/34; H04L 45/033; H04L 12/2832
See application file for complete search history.

(56) References Cited

U.S. PATENT DOCUMENTS 8,320,361 B2 * 11/2012 Mohapatra .............. H04L 45/22
370/351
11,394,644 B2 * 7/2022 Wang ....................... H04L 45/22
(Continued)

FOREIGN PATENT DOCUMENTS

EP 2413550 A1 2/2012

OTHER PUBLICATIONS

International Search Report and Written Opinion dated Aug. 9, 2019 for International Application No. PCT/IN2019/050387 filed May 15, 2019, consisting of 8-pages.
(Continued)

*Primary Examiner* — John D Blanton
(74) *Attorney, Agent, or Firm* — Weisberg I.P. Law, P.A.

(57) ABSTRACT

A network device (ND) receives a first media access control (MAC)/Internet Protocol (IP) route for a customer ND. The ND installs the first MAC/IP route in a MAC/IP routing table and transmits the first MAC/IP route to a first subset of NDs causing the NDs to install the first route. The ND receives a second MAC/IP route for the customer ND and a sequence number indicative of an order of advertisement of the second MAC/IP route. The ND determines, based on the sequence number, that the second MAC/IP route is a best route for the customer ND. The ND installs the second MAC/IP route as the best route for the customer ND; and transmits the second MAC/IP route to a second subset of NDs including a first ND from which the first MAC/IP route originated, causing the first ND to request withdrawal of the first MAC/IP route.

13 Claims, 12 Drawing Sheets

(51) Int. Cl.
*H04L 45/50* (2022.01)
*H04L 47/34* (2022.01)

(56) References Cited

U.S. PATENT DOCUMENTS

| | | | | |
|---|---|---|---|---|
| 2010/0265956 | A1* | 10/2010 | Li | H04L 45/02 |
| | | | | 370/401 |
| 2012/0189009 | A1* | 7/2012 | Shekhar | H04L 45/021 |
| | | | | 370/392 |
| 2013/0308646 | A1* | 11/2013 | Sajassi | H04L 45/50 |
| | | | | 370/395.53 |
| 2020/0358693 | A1* | 11/2020 | Rawlins | H04L 45/033 |

OTHER PUBLICATIONS

A. Sajassi et al.; BGP MPLS-Based Ethernet VPN; Internet Engineering Task Force (IETF); RFC 7432; Feb. 2015; consisting of 56-pages.

* cited by examiner

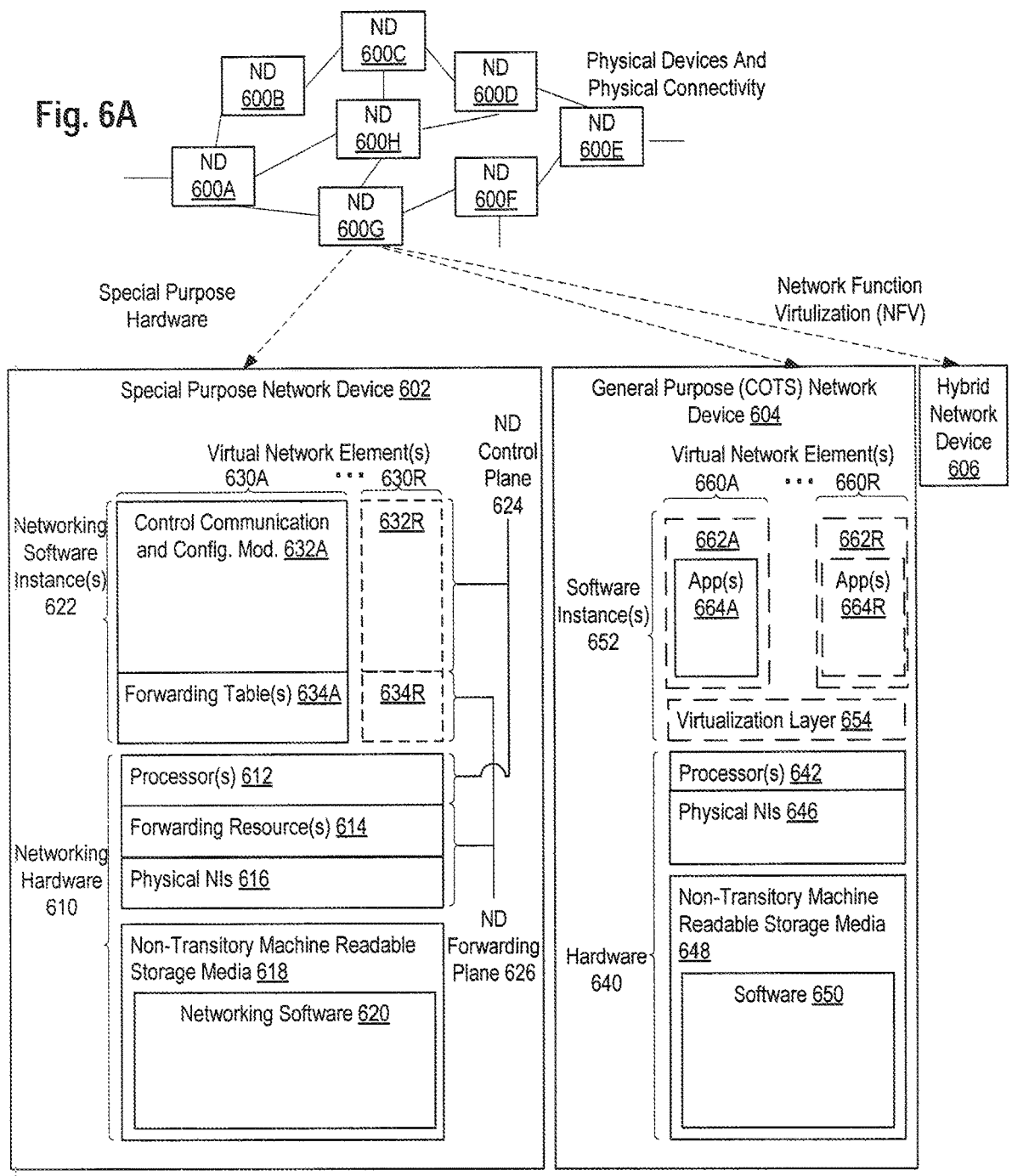
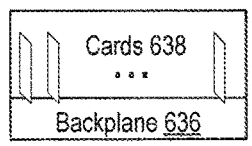

METHOD AND APPARATUS FOR LAYER 2 ROUTE CALCULATION IN A ROUTE REFLECTOR NETWORK DEVICE

TECHNICAL FIELD

Embodiments of the invention relate to the field of packet networks; and more specifically, to the Layer 2/Layer 3 route calculation in a route reflector router.

BACKGROUND ART

An Ethernet Virtual Private Network (EVPN) is a type of VPN technology which introduces routing Media Access Control (MAC) addresses using Multiprotocol Border Gateway Protocol (MP-BGP) over Multiprotocol Label Switching (MPLS). As with other types of VPNs, an EVPN is comprised of customer edge (CE) devices connected to provider edge (PE) devices that form the edge of an MPLS infrastructure. A CE may be a host, a router, or a switch. The PEs provide virtual Layer 2 bridged connectivity between the CEs. There may be multiple EVPN instances in a provider's network. The PEs may be connected by an MPLS Label Switched Path (LSP) infrastructure, which provides the benefits of MPLS technology, such as fast reroute, resiliency, etc. The PEs may also be connected by an IP infrastructure, in which case IP/GRE (Generic Routing Encapsulation) tunneling or other IP tunneling can be used between the PEs. The CEs can connect to multiple active points of attachment (i.e., to multiple PEs).

In EVPN, PEs advertise the MAC addresses learned from the CEs that are connected to them to other PEs in the control plane using BGP. Control-plane route learning through. MP-BGP offers greater control over a MAC route learning process. Each CE in an EVPN is coupled with a PE through an Ethernet Segment (ES). An Ethernet segment in an EVPN collects links into a bundle and assigns a number—called the Ethernet segment ID (ESI)—to the bundled links. When a CE moves from an Ethernet segment to another Ethernet segment, this is referred to as MAC mobility or a MAC move, Provider Edge (PE) devices discover the host MAC address from its local interfaces or from remote PE devices. When a PE device learns of a new local MAC address, it sends a MAC advertisement route message to other devices in the network. During this time, there are two advertised routes (the first one associated with the first Ethernet segment and the second route associated with the second Ethernet segment) and the PE devices in the EVPN network need to decide which of the MAC advertisement messages to use to determine the best path for to reach the CE.

SUMMARY

The embodiments of the present invention describe a mechanism of Layer 2 route calculation in a route reflector network device.

One general aspect includes a method in a network device that is communicatively coupled with a plurality of network devices and the network device is operative to act as a route reflector for the plurality of network devices, the method including: receiving a first media access control (mac)/ internet protocol (IP) route for a customer network device; installing the first MAC/IP route in a MAC/IP routing table as a best route for reaching the customer network device; transmitting the first MAC/IP route to a first subset of the plurality of network devices causing each one of the first subset of the plurality of network devices to install the route as a best route for the customer network device; receiving a second MAC/IP route for the customer network device and a sequence number for the second MAC/IP route, where the second MAC/IP route is different than the first MAC/IP route, and where the sequence number is indicative of an order of advertisement of the second MAC/IP route for the customer network device when compared with advertisement of other MAC/IP routes for the customer network device; determining, based on the sequence number, that the second MAC/IP route is a best route for the customer network device; installing the second MAC/IP route as the best route for the customer network device; and transmitting the second MAC/IP route to a second subset of the plurality of network devices including a first network device from which the first MAC/IP route originated, causing the first network device to request withdrawal of the first MAC/IP route.

One general aspect includes a network device that is to be communicatively coupled with a plurality of network devices and the network device is operative to act as a route reflector for the plurality of network devices, the network device including: one or more processors; and a non-transitory machine-readable storage medium that provides instructions that, when executed by the one or more processors, will cause the network device to; receive a first media access control (mac)/internet protocol (IP) route for a customer network device; install the first MAC/IP route in a MAC/IP routing table as a best route for reaching the customer network device; transmit the first MAC/IP route to a first subset of the plurality of network devices causing each one of the first subset of the plurality of network devices to install the route as a best route for the customer network device; receive a second MAC/IP route for the customer network device and a sequence number for the second MAC/IP route, where the second MAC/IP route is different than the first MAC/IP route, and where the sequence number is indicative of an order of advertisement of the second MAC/IP route for the customer network device when compared with advertisement of other MAC/IP routes for the customer network device; determine, based on the sequence number, that the second MAC/IP route is a best route for the customer network device; install the second MAC/IP route as the best route for the customer network device; and transmit the second MAC/IP route to a second subset of the plurality of network devices including a first network device from which the first MAC/IP route originated, causing the first network device to request withdrawal of the first MAC/IP route.

BRIEF DESCRIPTION OF THE DRAWINGS

The invention may best be understood by referring to the following description and accompanying drawings that are used to illustrate embodiments of the invention. In the drawings:

FIG. 6A illustrates connectivity between network devices (NDs) within an exemplary network, as well as three exemplary implementations of the NDs, according to some embodiments of the invention.

FIG. 6B illustrates an exemplary way to implement a special-purpose network device according to some embodiments of the invention.

DETAILED DESCRIPTION

Figure 1:
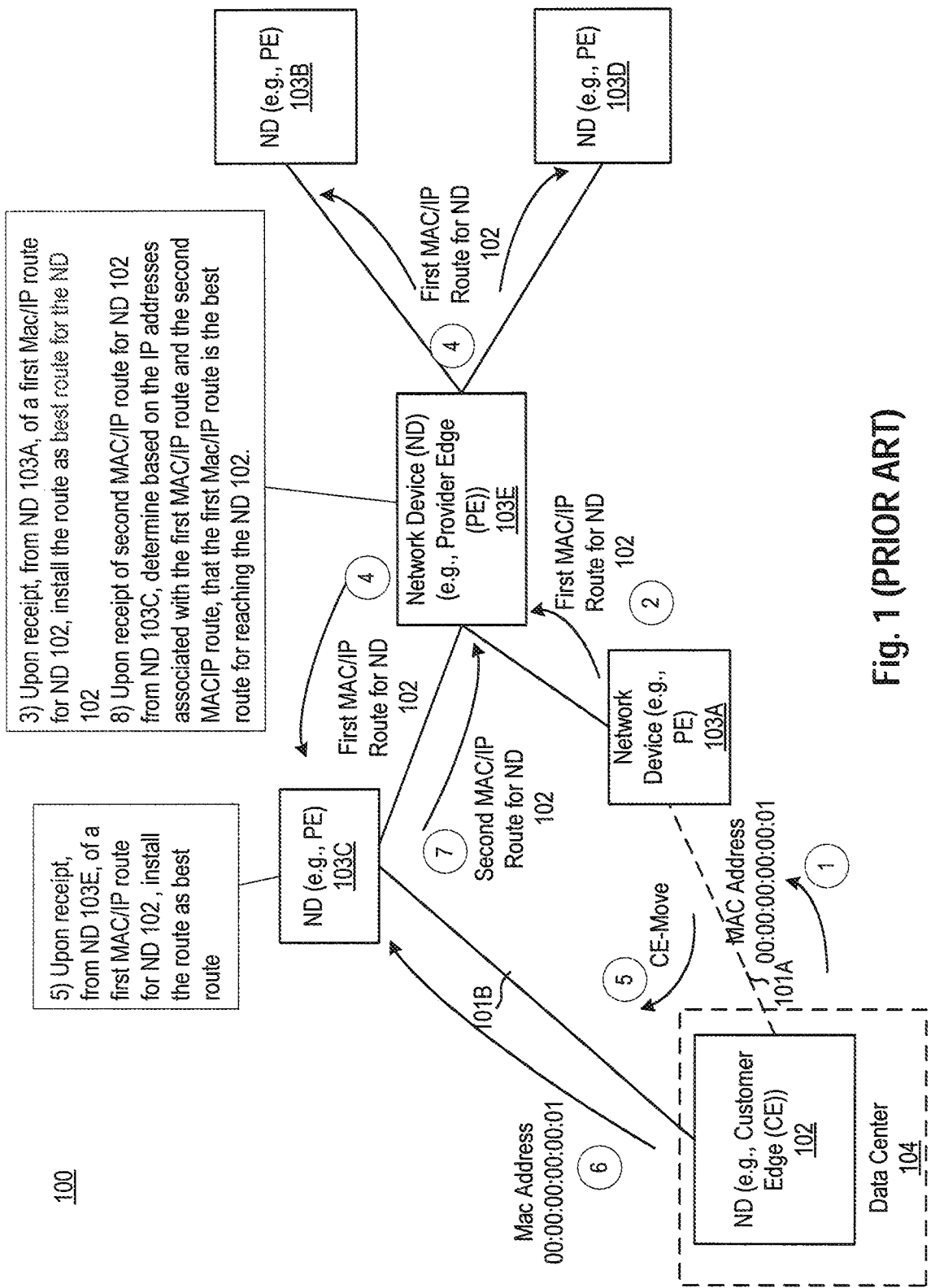
FIG. 1 illustrates a block diagram of an exemplary network including a network device acting as a route reflector, where Layer 2 route calculation is performed according to existing mechanisms.

The following description describes methods and apparatus for Layer 2 route calculation in a route reflector network device. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

Overview

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

Some NDs provide support for implementing VPNs (Virtual Private Networks) (e.g., Layer 2 VPNs and/or Layer 3 VPNs). For example, the NDs where a provider's network and a customer's network are coupled are respectively referred to as a PE (Provider Edge) and a CE (Customer Edge). In a Layer 2 VPN, forwarding typically is performed on the CE(s) on either end of the VPN and traffic is sent across the network (e.g., through one or more PEs coupled by other NDs). Layer 2 circuits are configured between the CEs and PEs (e.g., an Ethernet port, an ATM permanent virtual circuit (PVC), a Frame Relay PVC). In a Layer 3 VPN, routing typically is performed by the PEs. By way of example, an edge ND that supports multiple VNEs may be deployed as a PE; and a VNE may be configured with a VPN protocol, and thus that VNE is referred as a VPN VNE. An Ethernet Virtual Private Network (EVPN) is a type of VPN technology developed to address the limitations of Virtual Private LAN Service (VPLS) by providing multi-homing and redundancy, multicast optimization, provisioning simplicity, flow-based load balancing, and multipathing. IETF RFC 7432: "BGP MPLS-Based Ethernet VPN," February 2015, describes procedures for BGP MPLS based EVPN, which introduces routing MAC addresses using control plane routing protocol (e.g., Multiprotocol Border Gateway Protocol (MP-BGP)) over Multiprotocol Label Switching (MPLS). While the embodiments below will be described with reference to Ethernet and MP-BGP, other access technologies and routing and reachability technologies can respectively be used without departing from the scope and spirit of the present invention.

FIG. 1 illustrates a block diagram of an exemplary network 100 including a network device acting as a route reflector, where Layer 2 route calculation is performed according to existing mechanisms. The network 100 includes a set of access NDs 103A-E and ND 102. In some embodiments, the ND 102 is a customer edge (CEs) network device coupled with Provider Edge network devices NDs 103A through a first Ethernet segment 101A. The ND 102 may represent a connection point in the network in which a customer's site (e.g., a data center 104, customer's network, computing device, etc.) connects with a provider's network. One of ordinary skill in the art would understand that the number of NDs in network 100 is exemplary only and not intended to be limiting. A network 100 may include any number of network devices including several PEs and several CEs coupled to one or more of the PEs. In some embodiments, FIG. 1 illustrates an exemplary EVPN instance including the set of NDs 102 and 103A-E. Each one of the NDs 102 and 103A-E can be implemented as described in further details with reference to FIGS. 6A-F and 7.

The ND 102 may be a host, a router, or a switch coupled with one or more customer sites (not shown in FIG. 1). The NDs 103A-E provide virtual Layer 2 bridged connectivity between the ND 102 and other customer network device (not shown) of the network 100. For example, the NDs may be connected by an IP infrastructure, in which case IP/GRE (Generic Routing Encapsulation) tunneling or other IP tunneling can be used between the NDs. In other embodiments, the NDs can be coupled through an MPLS Label Switched Path (LSP) infrastructure, which provides the benefits of MPLS technology, such as fast reroute, resiliency, etc.

The network devices 103A-E are structured according to a first topology scenario in which the ND 103E acts as a route reflector for the set of network devices 103A, 103B, 103C, and 103D. A network device acting as a route reflector is configured to re-advertise routes learned from an internal peer in the network to other internal peers in the network. For example, the ND 103E is configured to act as a route reflector in the network 100. The ND 103E is operative to transmit routes received from one of the NDs 103A-D to the other ones of the NDs. So rather than requiring all internal peers to be fully meshed with each other, route reflection requires only that the route reflector be fully meshed with all internal peers. The route reflector ND 103E and all of its internal peers 103A-D form a cluster.

ND 102 can connect to one or more active points of attachment. For example, at time T1, ND 102 is coupled with ND 103A. During a route learning mechanism, the ND 103A learns the Layer 2 address of the ND 102. For example, the ND 102 advertises, at operation 1, its MAC address, e.g., "00:00:00:00:00:01." At operation 2, the ND 103A transmits a route for reaching the customer network device ND 102 to the ND 103E. For example, the ND 103A may transmit a first MAC/IP route for ND 102 to the ND 103E. At operation 3, the first MAC/IP route is installed and then forwarded, at operations 4, from the ND 103E to all the peers 103B-D, Upon receipt of the first MAC/IP route for the ND 102, each one of the NDs 103B-D installs the route as a best route for reaching the ND 102 (operation 5). In some embodiments, the ND 102 can be subject to a MAC move. For example, ND 102 may move from a first Ethernet segment 101A to a second Ethernet segment 101B. During a route learning mechanism (operation 6), the ND 103C learns the MAC address of the ND 102. Upon learning the new route for the ND 102, the ND 103C transmits, operation 7, a second MAC/IP route for ND 102 to the ND 103E, In some embodiments, the ND 103C may also transmit a MAC mobility attribute associated with the second route. The MAC mobility attribute is indicative of the order of advertisement of the routes for the ND 102. In these embodiments, the ND 103C determines that there is already a route installed in the ND 103C for the ND 102 and transmits the second route with a MAC mobility attributes that includes a sequence number that is greater than the sequence number associated with the route previously installed for the ND 102. For example, when the first route installed for ND 102 is the initial route learnt and installed for this ND (i.e., no other route was installed before the first route), there might not be any MAC mobility attribute associated with the first route, in that case the sequence number transmitted with the second route has a value of 1. Alternatively, if the first route is not the initial route installed for ND 102, this route may already have an associated sequence number and the sequence number transmitted with the second route equals the previous sequence number increased by 1. Further, ND 103C selects the local route as a best path for reaching ND 102 and installs the route. Installing a route includes storing one or more entries in a MAC routing table for the ND 102.

At operation 8, the ND 103E determines based on the IP address associated with the first MAC/IP route for ND 102 and the IP address associated with the second MAC/IP route for ND 102, which route is the best route for reaching ND 102 and consequently which of these two routes it to be kept for reaching the ND 102. The ND 103E has then received two routes for the ND 102 (first MAC/IP route and second MAC/IP route). The ND 103 performs a best path calculation and selects the route associated with the lowest IP address as a best route for reaching the customer ND 102. While the selected route should be the second route, through the ND 103C, as the first route is no longer available (the ND 102 has moved to a second Ethernet segment), the ND 103E may select the first route. Since the selection of the best route is performed on the IP address associated with each one of the routes, this selection is not accurately performed and the ND 103E has the wrong route installed for reaching the ND 102. As a result, the ND 102 does not install the second route, which is the new route for reaching the ND 102. Further, the ND 103E does not advertise the new route to the other peers in the network and the ND 103A, 103B, and 103D do not receive the second MAC/IP route for ND 102. This causes each of the ND 103A, ND 103B, and ND 103D to not install the second route for ND 102 and causes the ND 103A to not withdraw the first route for ND 102. Therefore, the NDs 103A, 103B, and 103D still have the first route installed as a best route for reaching ND 102, which is no longer available.

In some embodiments, the ND 103E is not operative to perform any other mechanisms that can be used for advertising the second route. For example, ND 103E is not operative to advertise multiple paths for a MAC address. Thus, upon receipt of the second route for the ND 102, the ND 103E cannot transmit the second route as the first route was already advertised. The ND 103E is only configured to determine a best path and the selection of the best path is performed based on the IP addresses associated with each one of the routes. Thus, in these prior art solutions, the route reflector of a network cannot select the correct route for a customer network device, causing loss of traffic and misconfiguration of the NDs with routes that are no longer available for the ND 102.

Enhanced Layer 2 Route Calculation in a Network Device Acting as a Route Reflector in a Network A method of calculation of a Layer 2 route for reaching a customer network device is described. The method is performed in a network device that is communicatively coupled with a plurality of network devices. The network device is operative to act as a route reflector for the plurality of network devices. The network device receives a first media access control (MAC)/Internet Protocol (IP) route for a customer network device. The network device installs the first MAC/IP route in a MAC/IP routing table as a best route for reaching the customer network device. The network device transmits the first MAC/IP route to a first subset of the plurality of network devices causing the one or more of the plurality of network devices to install the route as a best route for the customer network device. The network device receives a second MAC/IP route for the customer network device and a sequence number for the second MAC/IP route. The second MAC/IP route is different than the first MAC/IP route, and the sequence number is indicative of an order of advertisement of the second MAC/IP route for the customer network device when compared with advertisement of other MAC/IP routes for the customer network device. The network device determines, based on the sequence number, that the second MAC/IP route is a best route for the customer network device. The network device installs the second MAC/IP route as the best route for the customer network device; and transmits the second MAC/IP route to a second subset of the plurality of network devices including a first network device from which the first MAC/IP route originated, causing the first network device to request withdrawal of the first MAC/IP route.

Figure 2A:
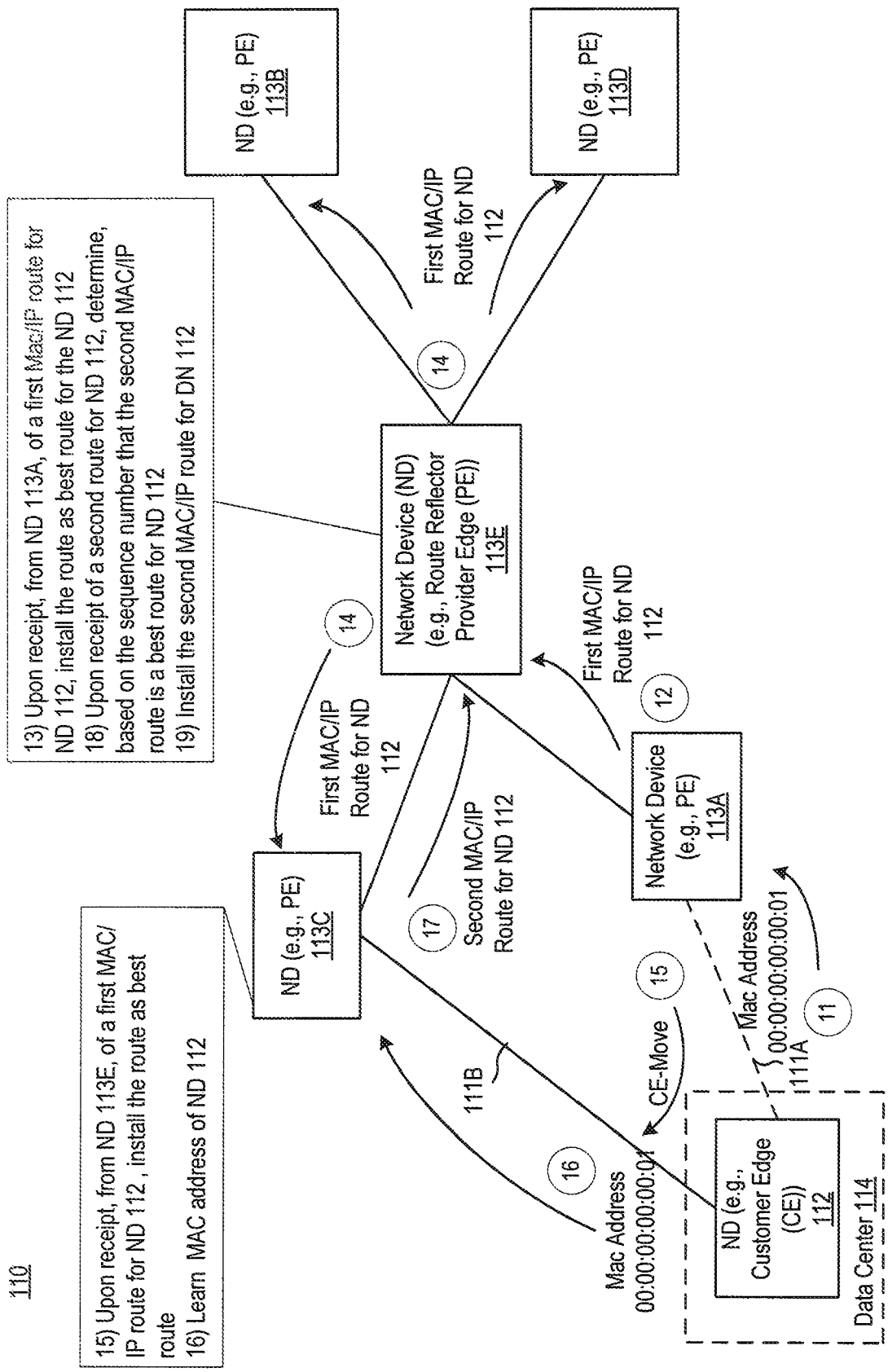
FIG. 2A illustrates a block diagram of an exemplary network including a network device acting as a route reflector where Layer 2 route calculation is performed according to some embodiments of the invention.
Figure 2B:
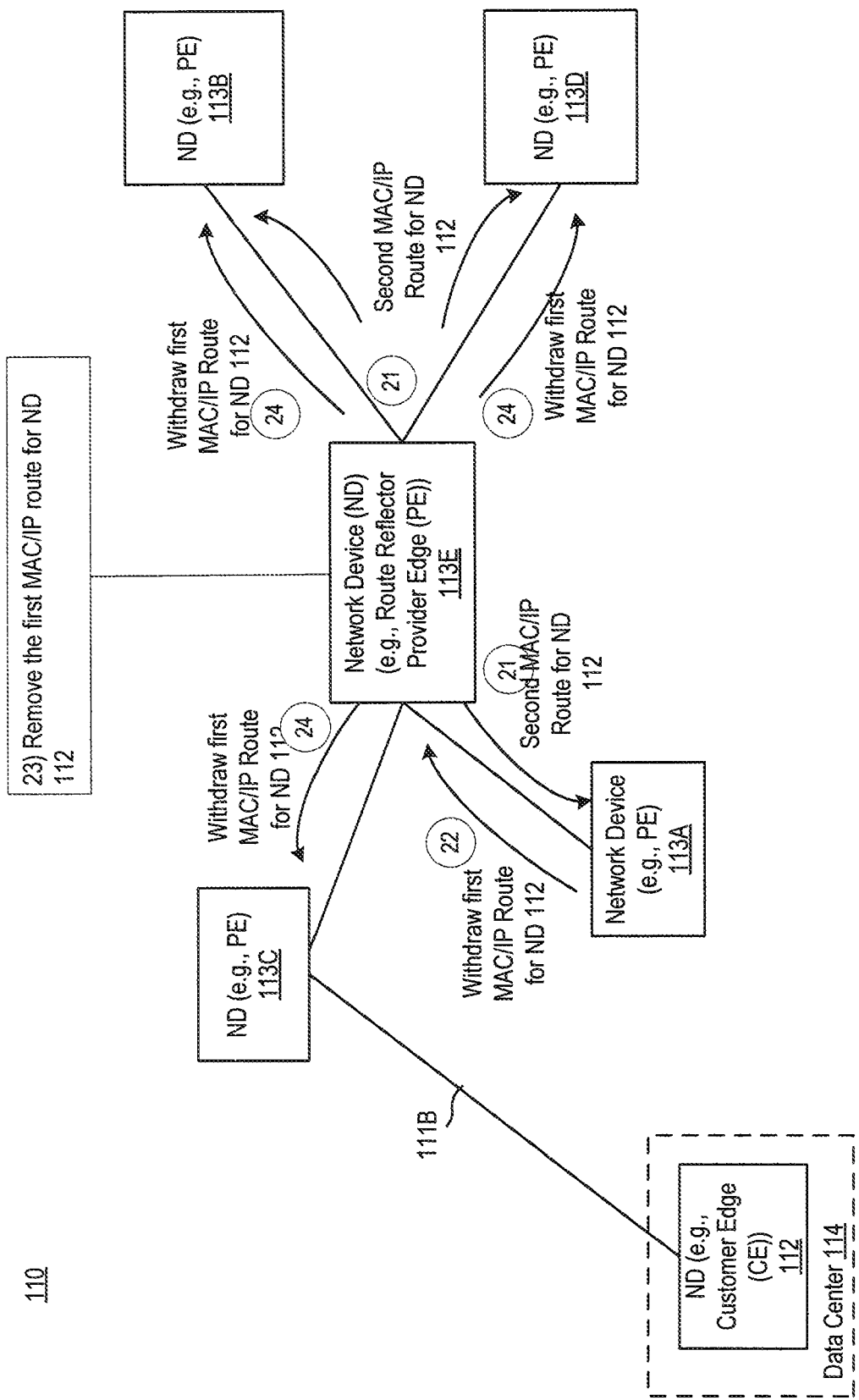
FIG. 2B illustrates a block diagram of an exemplary network including a network device acting as a route reflector where Layer 2 route calculation is performed according to some embodiments of the invention.

FIG. 2A-2B illustrate block diagrams of an exemplary network 110 including a network device acting as a route reflector where Layer 2 route calculation is performed according to some embodiments of the invention. The network 110 includes a set of access NDs 113A-E and ND 112. In some embodiments, the ND 112 is a customer edge (CEs) network device coupled with Provider Edge network devices NDs 113A through a first Ethernet segment 111A. The ND 112 may represent a connection point in the network in which a customer's site (e.g., a data center 114, customer's network, computing device, etc.) connects with a provider's network. One of ordinary skill in the art would understand that the number of NDs in network 110 is exemplary only and not intended to be limiting. A network 110 may include any number of network devices including several PEs and several CEs coupled to one or more of the PEs. In some embodiments, the network 110 of FIGS. 2A-2B illustrates an exemplary EVPN instance including the set of NDs 112 and 113A-E. Each one of the NDs 112 and 113A-E can be implemented as described in further details with reference to FIGS. 6A-F and 7.

The ND 112 may be a host, a router, or a switch coupled with one or more customer sites (not shown in FIGS. 2A-2B). The NDs 113A-E provide virtual Layer 2 bridged connectivity between the ND 112 and other customer network device (not shown) of the network 110. For example, the NDs may be connected by an IP infrastructure, in which case IP/GRE (Generic Routing Encapsulation) tunneling or other IP tunneling can be used between the NDs. In other embodiments, the NDs can be coupled through an MPLS Label Switched Path (LSP) infrastructure, which provides the benefits of MPLS technology, such as fast reroute, resiliency, etc.

The network devices 113A-E are structured according to a first topology scenario in which the ND 113E acts as a route reflector for the set of network devices 113A, 113B, 113C, and 113D. The topology of the network 110 is identical to the topology of the network 100. The network 110 includes a network device 113E that is operative to act as an enhanced route reflector for the set of NDs 113A-D. A network device acting as a route reflector is configured to re-advertise routes learned from an internal peer in the network to other internal peers in the network. In some embodiments, when the reachability and forwarding protocol used is BGP, a route reflector network device propagates routes inside a network, e.g., inside an autonomous system (AS) based on the following rules: 1) If a route is received from a non-client peer, the route reflector ND reflects the route to clients only and E-BGP (External BGP) peers. 2) If a route is received from a client peer, the route reflector ND reflects the route to all non-client peers and also to client peers, except the originator of the route and reflects the route to EBGP peers.

For example, the ND 113E is configured to act as a route reflector in the network 100. The ND 113E is operative to transmit routes received from one of the NDs 113A-D to the other ones of the NDs. So rather than requiring all internal peers to be fully meshed with each other, by using route reflection the route reflector is fully meshed with all internal peers. The route reflector ND 113E and all of its internal peers 113A-D form a cluster.

ND 112 can connect to one or more active points of attachment. For example, at time T1, ND 112 is coupled with ND 113A. During a route learning mechanism, the ND 113A learns the Layer 2 address of the ND 112. For example, the ND 112 advertises, at operation 11, its MAC address, e.g., "00:00:00:00:00:01." At operation 12, the ND 103A transmits a route for reaching the customer network device ND 112 to the ND 113E. For example, the ND 113A may transmit a first MAC/IP route for ND 112 to ND 113E. The ND 113A may transmit the first MAC/IP route for ND 112 via a BGP MAC/IP advertisement. The MAC/IP route advertisement includes multiple attributes that identify the MAC/IP route for reaching the ND 112. At operation 13, the first MAC/IP route is installed and then forwarded, at operations 14, from the ND 113E to all the peers 113B-D. For example, the ND 113E may transmit a first MAC/IP route advertisement. The first MAC/IP route advertisement is a BGP message to advertise the first MAC/IP route. The first MAC/IP route advertisement includes multiple attributes that can be used to identify the first route for ND 112. Upon receipt of the first MAC/IP route for the ND 112, each one of the NDs 113B-D installs the route as a best route for reaching the ND 112 (operation 15).

In some embodiments, the ND 112 can be subject to a MAC move (operation 15). For example, ND 112 may move from a first Ethernet segment 111A to a second Ethernet segment 111B. During a route learning mechanism, the ND 113C learns, at operation 16, the MAC address of the ND 112 following the move of the ND 112 to the second segment 111B. Upon learning the new route for the ND 112, the ND 113C transmits, at operation 17, a second MAC/IP route for ND 112 to the ND 113E. The ND 113C may also transmit a sequence number with the second MAC/IP route for ND 102. The sequence number is indicative of an order of advertisement of the second MAC/IP route for the customer network device 112 when compared with advertisement of other MAC/IP routes for the customer network device. In some embodiments, the sequence number can be included in a BGP MAC mobility extended community attribute (referred to herein as a MAC mobility attribute) associated with the second route. The MAC mobility attribute is indicative of the order of advertisement of the routes for the ND 112. The sequence number is determined at the ND 113C based on previously installed routes for the ND 112.

In the illustrated example of FIGS. 2A-B, the ND 113C determines that there is already a route installed for the ND 102, the first MAC/IP route, and transmits the second route with a MAC mobility attributes that includes a sequence number that is greater than the sequence number associated with the route previously installed for the ND 112. For example, when the first route installed for ND 112 is the initial route learnt and installed for this ND, there might not be any MAC mobility attribute associated with the first route, in that case the sequence number transmitted with the second route has a value of 1. Alternatively, if the first route is not the initial route installed for ND 112, this route may already have an associated MAC mobility attribute including a respective sequence number and the sequence number transmitted with the second route equals the previous sequence number increased by 1 (e.g., 2, 3, . . . , N). Further, ND 113C selects the local route as a best path for reaching ND 112 and installs the route. Installing a route includes storing one or more entries in a MAC routing table for the ND 112.

At operation 18, upon receipt of the second MAC/IP route for the ND 112, the ND 113E determines based on the sequence number, that the second MAC/IP route is a best route for the customer network device. At operation 19, the network device 113E installs the second. MAC/IP route as the best route for the customer network device.

FIG. 2B illustrates operations performed in the network 110 following the determination at the ND 113E that the second route is the best route for reaching ND 112 in the network 110. At operation 21, the ND 113E transmits, the second MAC/IP route to ND 113A, ND 113B, and ND 113D. Each one of the NDs 113A-B and ND 113D installs the second. MAC/IP route for ND 112. The installation of the second MAC/IP route in each one of these devices can be performed following the determination that the second route is a best route for ND 112 based on the sequence number associated with the second route. Similarly, to the operations performed in the ND 113E, each one of the devices determines that the second route is associated with a sequence number that is greater than the sequence number of the route previously installed for the ND 112 (i.e., the first route) and therefore that the second route is to be selected as a best route for reaching the ND 112 in the network 110.

The subset of network devices, ND 113A, ND 113B, and ND 113D, includes the first network device ND 113A from which the first MAC/IP route originated causing the first network device 113A to request withdrawal of the first MAC/IP route upon receipt of the second MAC/IP route. Thus, upon receipt of the second MAC/IP route for ND 112, the ND 113A transmits, at operation 22, a request to withdraw the first MAC/IP route for ND 112. The request to withdraw the MAC/IP route can be a BGP withdraw MAC/IP route advertisement. The message causes ND 113E to remove, at operation 23, the first MAC/IP route for ND 112. Removing the first MAC/IP route for ND 112, includes removing any entries from routing table (e.g., MAC routing table) in the ND 113 for the first route. The ND 113E is then operative, as a result of being a route reflector, to transmit the request to withdraw the first MAC/IP route to NDs 113C, 113B, and 113D resulting in these network devices to also remove the first MAC/IP route for ND 112.

In some embodiments, the ND 113E is not operative to perform any other mechanisms that can be used for advertising the second route. For example, ND 103E is not operative to advertise multiple paths for a MAC address. Thus, upon receipt of the second route for the ND 112, the ND 113E cannot transmit the second route as the first route was already advertised. As opposed to prior art approaches, in which the ND would rely on the IP addresses to select the best path for the ND 112, the ND 113E can now accurately determine the more recent route advertised for the ND 112 by performing the selection of the best route based on the sequence number received with the route. Thus, the embodiments described herein present significant advantages when compared to previously existing solutions. Solution:

To solve this problem, we must modify the BGP route computation in RR as mentioned below.

With this modification higher sequence number path will be advertised, so that the old MAC/IP routes will get withdrawn.

a). During the path comparison, if all the attributes are same, then before selecting the least IP address as a preferred one, select the higher sequence number path as preferred one.

The operations in the flow diagrams will be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams. For example, while the FIGS. 2A-B illustrate a network 110 including a set of network devices forming an EVPN instance, in which BGP is used as a forwarding and reachability protocol for MAC/IP route learning through the control plane, other forwarding and reachability protocols can be used for Layer 2 route learning according to the operations of FIGS. 3A-4B without departing from the inventive concept presented herein. Further, while FIGS. 2A-B illustrate a network 110 with a given topology, this topology is exemplary and other examples of networks including a network device acting as a route reflector can be used.

Figure 3A:
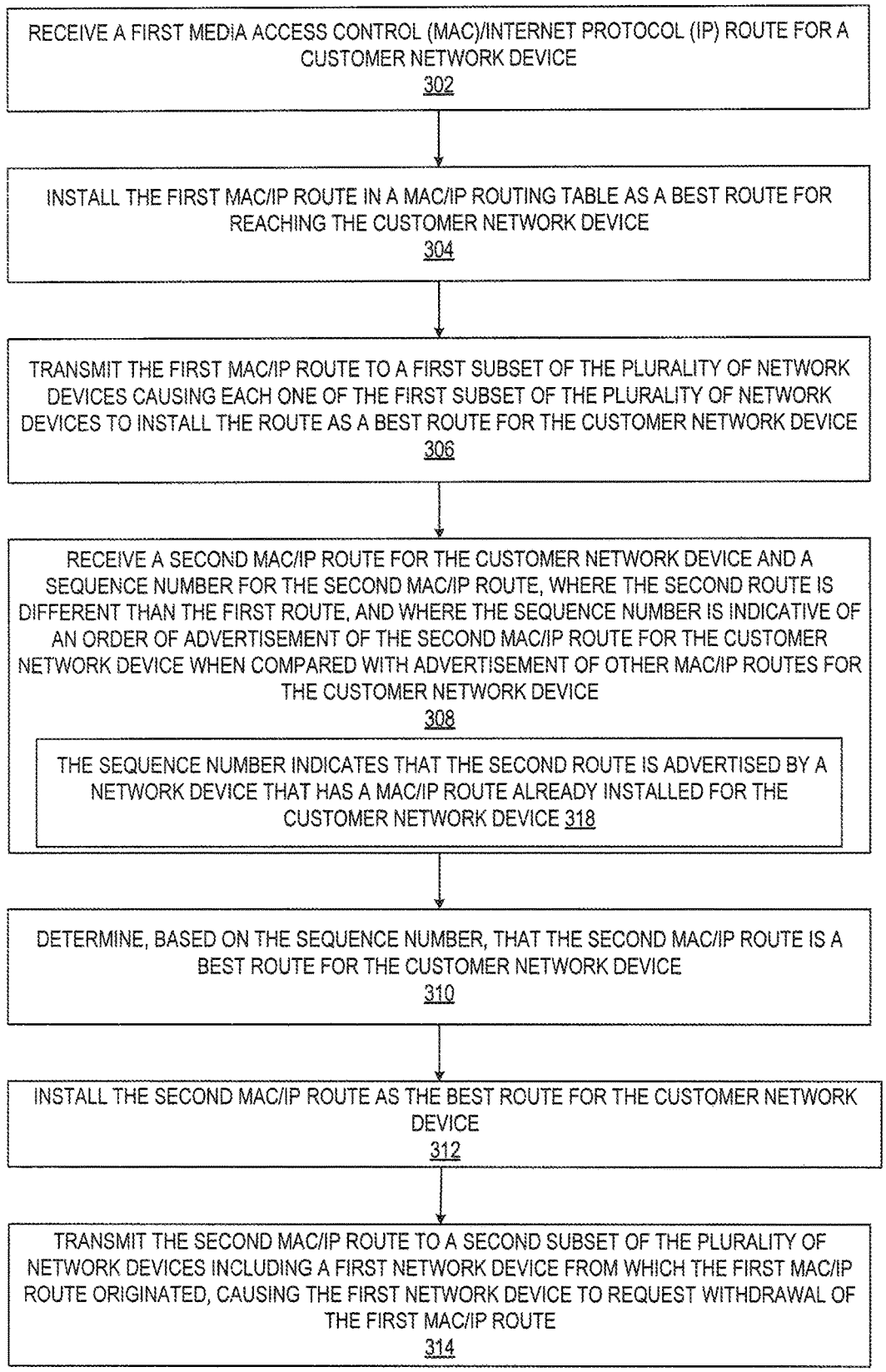
FIG. 3A illustrates a flow diagram of exemplary operations for Layer 2 route calculation in a network device acting as a route reflector for a plurality of network devices, in accordance with some embodiments.

FIG. 3A illustrates a flow diagram of exemplary operations for Layer 2 route calculation in a network device acting as a route reflector for a plurality of network devices, in accordance with some embodiments. The operations of FIG. 3A can be performed in the ND 113E, which acts as a route reflector for the set of network devices 113A-D.

Figure 5:
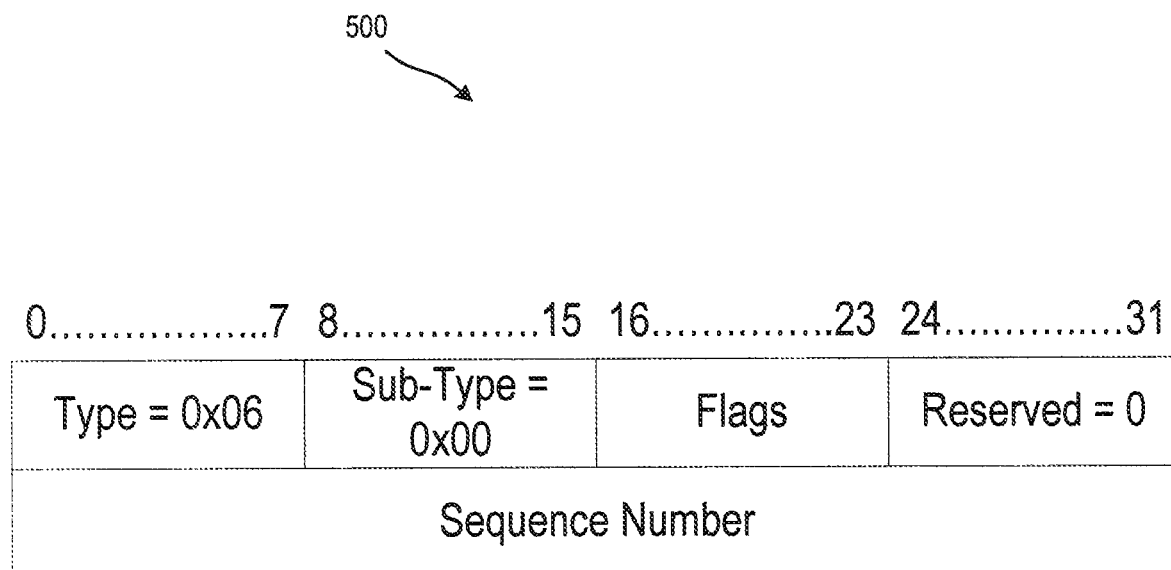
FIG. 5 illustrates a block diagram of an exemplary MAC mobility extended community attribute, in accordance with some embodiments.

At operation '302, the ND 113E receives a first media access control (MAC)/Internet Protocol (IP) route for a customer network device. In some embodiments, the ND 113E may also receive a first sequence number associated with the first MAC/IP route. The sequence number is indicative of the order of advertisement of the first MAC/IP route when compared with other MAC/IP route advertisements for the ND 112. The MAC/IP route is a Layer 2 route for the ND 112. In one embodiment, the MAC/IP route can be received through a BGP MAC/IP route advertisement including multiple attributes about the route. In this embodiment, the sequence number can be included in a MAC mobility extended community attribute as illustrated with reference to FIG. 5. The MAC mobility extended community attribute is a transitive extended community defined in BGP-EVPN. In some embodiments, the MAC Mobility extended community 500 is encoded as an 8-octet value as illustrates in FIG. 5. The MAC mobility extended community attribute of FIG. 5 has a Type field value of 0x06 and a Sub-Type field value of 0x00. The low-order bit of the Flags octet is defined as the "Sticky/static" flag and may be set to 1. A value of 1 means that the MAC address is static and cannot move. The sequence number is used by network devices to retain the correct MAC/IP Advertisement route when multiple updates occur for the same MAC address as it will be discussed in further details below.

At operation '304, the ND 113E installs the first MAC/IP route in a MAC/IP routing table as a best route for reaching the customer network device 112. The flow of operations then moves to operation '306, at which, the ND 113E transmits the first MAC/IP route to a first subset of network devices causing the one or more of network devices to install the route as a best route for the customer network device.

At operation '308, the ND 113E receives a second MAC/IP route for the customer network device and a sequence number for the second MAC/IP route. The second MAC/IP route is different than the first MAC/IP route, and the sequence number is indicative of an order of advertisement of the second MAC/IP route for the customer network device when compared with advertisement of other MAC/IP routes for the customer network device.

At operation '310, the ND 113E determines, based on the sequence number, that the second MAC/IP route is a best route for the customer network device.

At operation '312, the ND 113E installs the second MAC/IP route as the best route for the customer network device 112, and transmits (at operation '314) the second MAC/IP route to a second subset of the network devices including a first network device from which the first MAC/IP route originated, causing the first network device to request withdrawal of the first MAC/IP route. The use of the sequence number, by a network device acting as a route reflector, to determine the best route for reaching a network device enables the network device to determine the correct route for reaching a customer network device which has moved from a first Ethernet segment to another Ethernet segment.

Figure 3B:
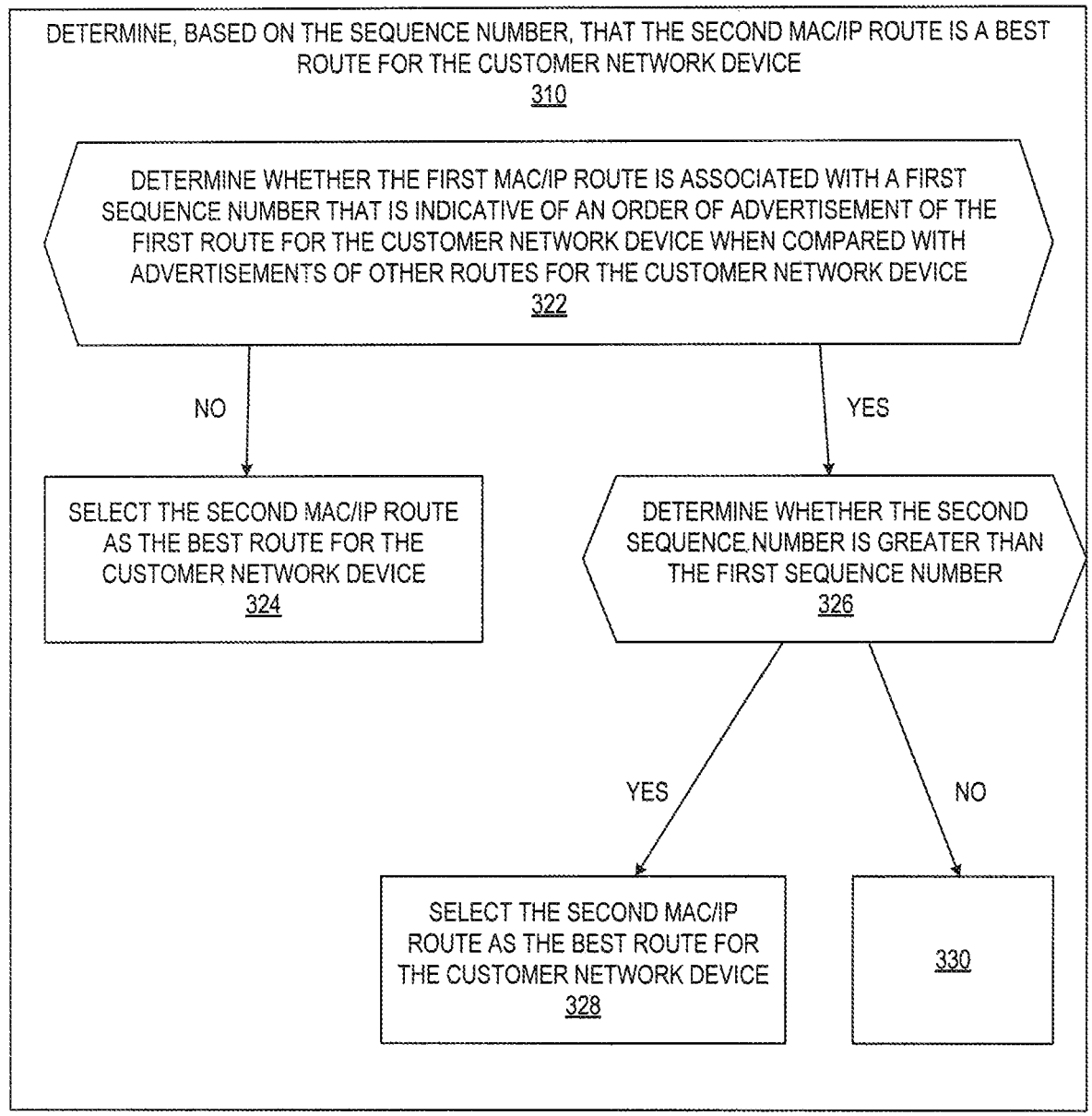
FIG. 3B illustrates a flow diagram of exemplary operations for determining based on a sequence number a best route for a customer network device in a network device acting as a route reflector for a plurality of network devices, in accordance with some embodiments.

FIG. 3B illustrates a flow diagram of exemplary operations for determining based on a sequence number a best route for a customer network device in a network device acting as a route reflector for a plurality of network devices, in accordance with some embodiments. The operations of FIG. 3B may be performed following one or more operations performed by ND 113E upon receipt of the second MAC/IP route for ND 112. For example, the operations can be performed following a determination that a route advertisement received at ND 113E is a route advertisement for ND 112. Further, the ND 113E may determine that the route advertisement is for the instance including all the NDs 113A-E and 102. The ND 113D may compare one or more attributes of the advertisement for the first route and the advertisement for the second route to determine that the two advertisements are different routes for the same ND 112.

ND 113E determines, at operation '322, whether the first MAC/IP route is associated with a first sequence number that is indicative of an order of advertisement of the first route for the customer network device when compared with advertisements of other routes for the customer network device. Responsive to determining that the first MAC/IP route is not associated with a first sequence number, the ND 113E selects, at operation '324, the second MAC/IP route as the best route for the customer network device. For example, the ND 113E may determine that the route installed for the ND 112 is an initial route and no other route was advertised for this ND 112 prior to this initial route. In this case, the route installed for ND 112 may not have been received with a sequence number assigned in the advertisement message. The ND 113E determines then that the second MAC/IP route is a most recent route for the ND 112 based on the sequence number that is associated with the second route. In the embodiments, where the second route is advertised in a BGP MAC/IP route advertisement, the sequence number can be included in a MAC mobility extended community attribute such as the MAC mobility extended community attribute 500 of FIG. 5.

Figure 3C:
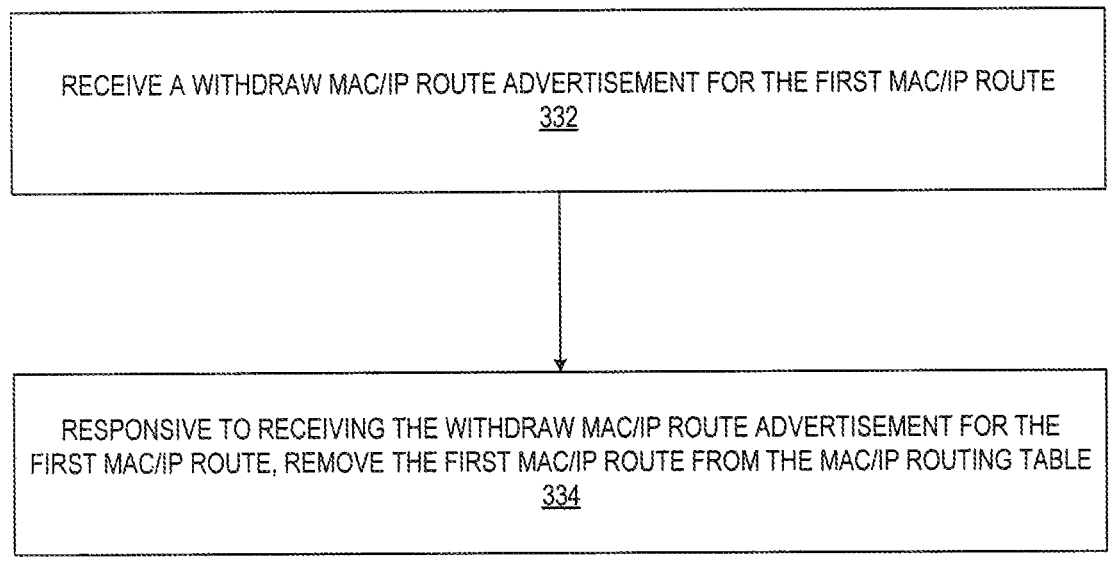
FIG. 3C illustrates a flow diagram of exemplary operations performed in a network device acting as a route reflector, in accordance with some embodiments.

Alternatively, the ND 113E may determine that the first MAC/IP route is associated with the first sequence. Upon determining that the first MAC/IP route is associated with the first sequence number, the flow of operations moves to operation '326, at which the ND 113E determines whether the second sequence number is greater than the first sequence number. Responsive to determining that the second sequence number is greater than the first sequence number, the ND 113E selects, at operation '328, the second MAC/IP route as the best route for the customer network device. Alternatively, responsive to determining that the second sequence number is not greater than the first sequence number, the ND 113E does not perform any operation and ignores the new route received for the ND 112. In this case, the first route that is installed in the ND 113E (and the peer NDs) remains the best route for the ND 112, FIG. 3C illustrates a flow diagram of exemplary operations performed in a network device acting as a route reflector, in accordance with some embodiments. Once the ND 113E determines that the second MAC/IP route is a best route for the ND 112 and transmits the route to the set of NDs 113A-D, the ND 113A receives the second MAC/IP route resulting in the ND 113A, from which the first route originated, to withdraw the first MAC/IP route. The ND 113E receives, at operation '332, a withdraw MAC/IP route advertisement for the first MAC/IP route. Responsive to receiving the withdraw MAC/IP route advertisement for the first MAC/IP route, the ND 113E removes, at operation '334, the first MAC/IP route form the MAC/IP routing table of the ND 113E.

Figure 4A:
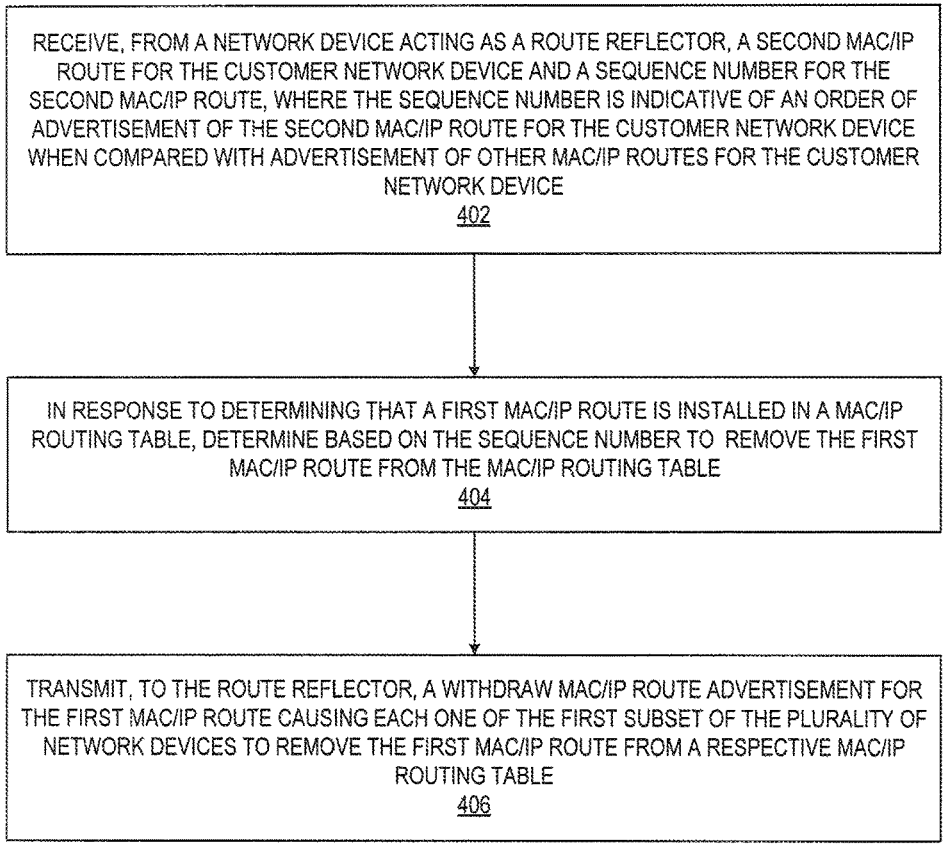
FIG. 4A illustrates a flow diagram of exemplary operations for removing a previous Layer 2 route of a customer network device, in accordance with some embodiments.

FIG. 4A illustrates a flow diagram of exemplary operations for removing a previous Layer 2 route of a customer network device, in accordance with some embodiments. The operations of FIG. 4A are performed in a network route that originated the first MAC/IP route (for example, ND 113A).

At operation '402, The ND 113A receives from a network device acting as a route reflector ND 113E, a second MAC/IP route for the customer network device and a sequence number for the second. MAC/IP Route. The sequence number is indicative of an order of advertisement of the second MAC/IP route for the customer network device when compared with advertisement of other MAC/IP routes for the customer network device. At operation '404, in response to determining that a first MAC/IP route is installed in a MAC/IP routing table, the ND 113A determines based on the sequence number to remove the first MAC/IP route from the MAC/IP routing table. At operation '406, the ND 113A transmits, to the route reflector, a withdraw MAC/IP route advertisement for the first MAC/IP route causing each one of the first subset of the plurality of network devices to remove the first MAC/IP route from a respective MAC/IP routing table.

Figure 4B:
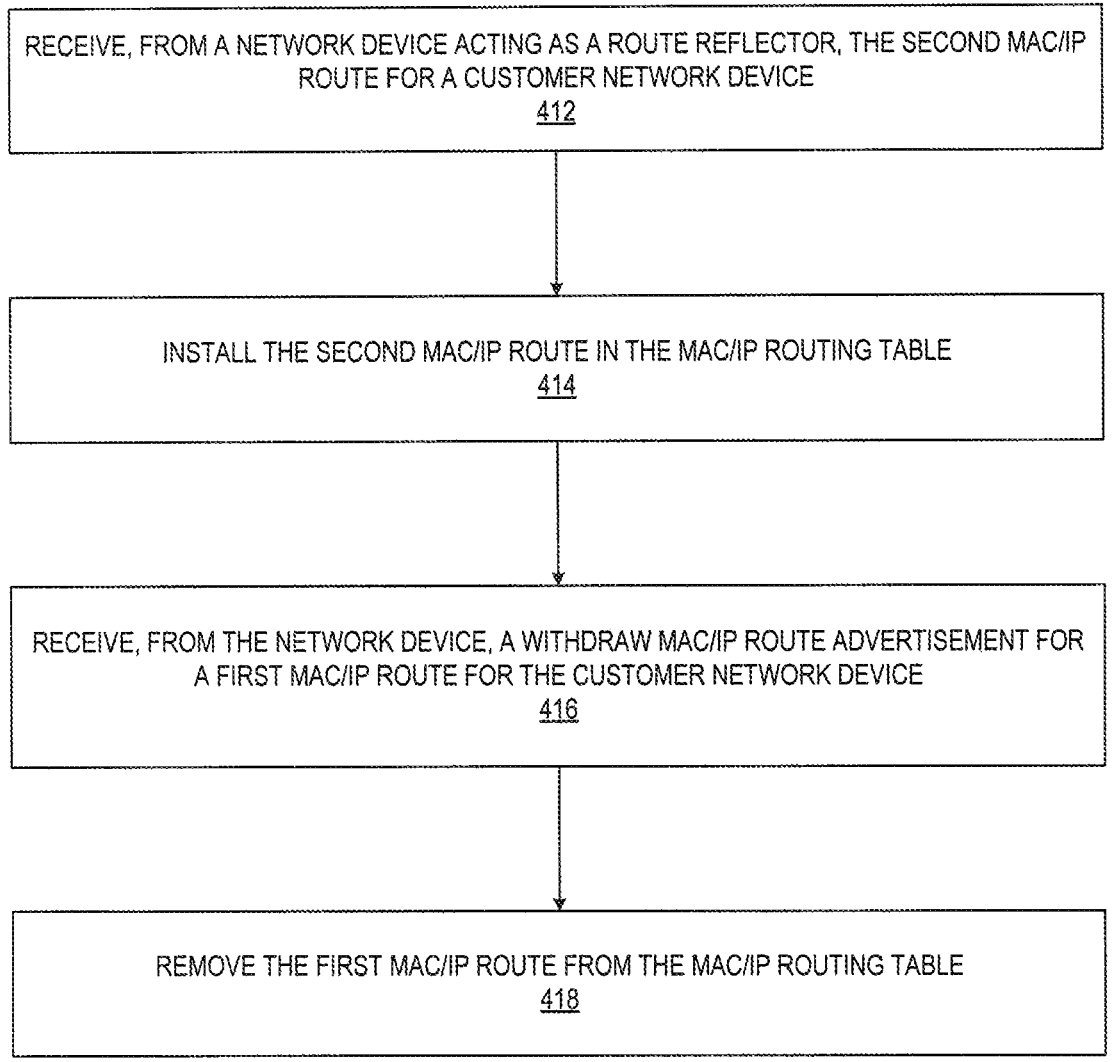
FIG. 4B illustrates a flow diagram of exemplary operations for installation and removal of Layer 2 routes in a network device, in accordance with some embodiments.

FIG. 4B illustrates a flow diagram of exemplary operations for installation and removal of Layer 2 routes in a network device, in accordance with some embodiments. The operations of FIG. 411 can be performed in the NDs 113B-D upon determination of the ND 113E that the second MAC/IP route is the best route for ND 112s. At operation '412, a network device, e.g., one of 113B-D, receives, from a network device acting as a route reflector ND 113E, the second MAC/IP route for a customer network device. At operation '414, the network device installs the second MAC/IP route in the MAC/IP routing table. The flow then moves to operation '414, at which the network device receives, from the network device, a withdraw MAC/IP route advertisement for a first MAC/IP route for the customer network device. Upon receipt of the withdraw MAC/IP route advertisement, the network device Removes, at operation '418, the first MAC/IP route from the MAC/IP routing table.

General Architecture

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, solid state drives, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors (e.g., wherein a processor is a microprocessor, controller, microcontroller, central processing unit, digital signal processor, application specific integrated circuit, field programmable gate array, other electronic circuitry, a combination of one or more of the preceding) coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) (NI(s)) to establish network connections (to transmit and/or receive code and/or data using propagating signals) with other electronic devices. For example, the set of physical NIs (or the set of physical NI(s) in combination with the set of processors executing code) may perform any formatting, coding, or translating to allow the electronic device to send and receive data whether over a wired and/or a wireless connection. In some embodiments, a physical NI may comprise radio circuitry capable of receiving data from other electronic devices over a wireless connection and/or sending data out to other devices via a wireless connection. This radio circuitry may include transmitter(s), receiver(s), and/or transceiver(s) suitable for radiofrequency communication. The radio circuitry may convert digital data into a radio signal having the appropriate parameters (e.g., frequency, timing, channel, bandwidth, etc.). The radio signal may then be transmitted via antennas to the appropriate recipient(s). In some embodiments, the set of physical NI(s) may comprise network interface controller(s) (NICs), also known as a network interface card, network adapter, or local area network (LAN) adapter. The NIC(s) may facilitate in connecting the electronic device to other electronic devices allowing them to communicate via wire through plugging in a cable to a physical port connected to a NIC. One or more parts of an embodiment of the invention may be implemented using different combinations of software, firmware, and/or hardware.

FIG. 6A illustrates connectivity between network devices (NDs) within an exemplary network, as well as three exemplary implementations of the NDs, according to some embodiments of the invention. FIG. 6A shows NDs '600A-H, and their connectivity by way of lines between '600A-'600B, '600B-'600C, '600C-'600D, '600D-'600E, '600E-'600F, '600F-'600G, and '600A-'600G, as well as between '600H and each of '600A, '600C, '600D, and '600G. These NDs are physical devices, and the connectivity between these NDs can be wireless or wired (often referred to as a link). An additional line extending from NDs '600A, '600E, and '600F illustrates that these NDs act as ingress and egress points for the network (and thus, these NDs are sometimes referred to as edge NDs; while the other NDs may be called core NDs).

Two of the exemplary ND implementations in FIG. 6A are: 1) a special-purpose network device '602 that uses custom application-specific integrated-circuits (ASICs) and a special-purpose operating system (OS); and 2) a general-purpose network device '604 that uses common off-the-shelf (COTS) processors and a standard OS.

The special-purpose network device '602 includes networking hardware '610 comprising a set of one or more processor(s) '612, forwarding resource(s) '614 (which typically include one or more ASICs and/or network processors), and physical network interfaces (NIs) '616 (through which network connections are made, such as those shown by the connectivity between NDs '600A-H), as well as non-transitory machine readable storage media '618 having stored therein networking software '620. During operation, the networking software '620 may be executed by the networking hardware '610 to instantiate a set of one or more networking software instance(s) '622. Each of the networking software instance(s) '622, and that part of the networking hardware '610 that executes that network software instance (be it hardware dedicated to that networking software instance and/or time slices of hardware temporally shared by that networking software instance with others of the networking software instance(s) '622), form a separate virtual network element '630A-R. Each of the virtual network element(s) (VNEs) '630A-R includes a control communication and configuration module '632A-R (sometimes referred to as a local control module or control communication module) and forwarding table(s) '634A-R, such that a given virtual network element (e.g., '630A) includes the control communication and configuration module (e.g., '632A), a set of one or more forwarding table(s) (e.g., '634A), and that portion of the networking hardware '610 that executes the virtual network element (e.g., '630A).

The special-purpose network device '602 is often physically and/or logically considered to include: 1) a ND control plane '624 (sometimes referred to as a control plane) comprising the processor(s) '612 that execute the control communication and configuration module(s) '632A-R; and 2) a ND forwarding plane '626 (sometimes referred to as a forwarding plane, a data plane, or a media plane) comprising the forwarding resource(s) '614 that utilize the forwarding table(s) '634A-R and the physical NIs '616. By way of example, where the ND is a router (or is implementing routing functionality), the ND control plane '624 (the processor(s) '612 executing the control communication and configuration module(s) '632A-R) is typically responsible for participating in controlling how data (e.g., packets) is to be routed (e.g., the next hop for the data and the outgoing physical NI for that data) and storing that routing information in the forwarding table(s) '634A-R, and the ND forwarding plane '626 is responsible for receiving that data on the physical NIs '616 and forwarding that data out the appropriate ones of the physical NIs '616 based on the forwarding table(s) '634A-R.

FIG. 6B illustrates an exemplary way to implement the special-purpose network device '602 according, to some embodiments of the invention. FIG. 6B shows a special-purpose network device including cards '638 (typically hot pluggable). While in some embodiments the cards '638 are of two types (one or more that operate as the ND forwarding plane '626 (sometimes called line cards), and one or more that operate to implement the ND control plane '624 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec), Secure Sockets Layer (SSL)/ Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane '636 (e.g., a first full mesh coupling the line cards and a second full mesh coupling all of the cards).

Returning to FIG. 6A, the general-purpose network device '604 includes hardware '640 comprising a set of one or more processor(s) '642 (which are often COTS processors) and physical NIs '646, as well as non-transitory machine-readable storage media '648 having stored therein software '650. During operation, the processor(s) '642 execute the software '650 to instantiate one or more sets of one or more applications '664A-R. While one embodiment does not implement virtualization, alternative embodiments may use different forms of virtualization. For example, in one such alternative embodiment the virtualization layer '654 represents the kernel of an operating system (or a shim executing on a base operating system) that allows for the creation of multiple instances '662A-R called software containers that may each be used to execute one (or more) of the sets of applications '664A-R; where the multiple software containers (also called virtualization engines, virtual private servers, or jails) are user spaces (typically a virtual memory space) that are separate from each other and separate from the kernel space in which the operating system is run; and where the set of applications running in a given user space, unless explicitly allowed, cannot access the memory of the other processes. In another such alternative embodiment the virtualization layer '654 represents a hypervisor (sometimes referred to as a virtual machine monitor (VMM)) or a hypervisor executing on top of a host operating system, and each of the sets of applications '664A-R is run on top of a guest operating system within an instance '662A-R called a virtual machine (which may in some cases be considered a tightly isolated form of software container) that is run on top of the hypervisor—the guest operating system and application may not know they are running on a virtual machine as opposed to running on a "bare metal" host electronic device, or through para-virtualization the operating system and/or application may be aware of the presence of virtualization for optimization purposes. In yet other alternative embodiments, one, some or all of the applications are implemented as unikernel(s), which can be generated by compiling directly with an application only a limited set of libraries (e.g., from a library operating system (LibOS) including drivers/libraries of OS services) that provide the particular OS services needed by the application. As a unikernel can be implemented to run directly on hardware '640, directly on a hypervisor (in which case the unikernel is sometimes described as running within a LibOS virtual machine), or in a software container, embodiments can be implemented fully with unikernels running directly on a hypervisor represented by virtualization layer '654, unikernels running within software containers represented by instances '662A-R, or as a combination of unikernels and the above-described techniques (e.g., unikernels and virtual machines both run directly on a hypervisor, unikernels and sets of applications that are run in different software containers).

The instantiation of the one or more sets of one or more applications '664A-R, as well as virtualization if implemented, are collectively referred to as software instance(s) '652. Each set of applications '664A-R, corresponding virtualization construct (e.g., instance '662A-R) if implemented, and that part of the hardware '640 that executes them (be it hardware dedicated to that execution and/or time slices of hardware temporally shared), forms a separate virtual network element(s) '660A-R.

The virtual network element(s) '660A-R perform similar functionality to the virtual network element(s) '630A-R— e.g., similar to the control communication and configuration module(s) '632A and forwarding table(s) '634A (this virtualization of the hardware '640 is sometimes referred to as network function virtualization (NFV)). Thus, NFV may be used to consolidate many network equipment types onto industry standard high-volume server hardware, physical switches, and physical storage, which could be located in Data centers, NDs, and customer premise equipment (CPE). While embodiments of the invention are illustrated with each instance '662A-R corresponding to one VNE '660A-R, alternative embodiments may implement this correspondence at a finer level granularity (e.g., line card virtual machines virtualize line cards, control card virtual machine virtualize control cards, etc.); it should be understood that the techniques described herein with reference to a correspondence of instances '662A-R to VNEs also apply to embodiments where such a finer level of granularity and/or unikernels are used.

In certain embodiments, the virtualization layer '654 includes a virtual switch that provides similar forwarding services as a physical Ethernet switch. Specifically, this virtual switch forwards traffic between instances '662A-R and the physical NI(s) '646, as well as optionally between the instances '662A-R; in addition, this virtual switch may enforce network isolation between the VNEs '660A-R that by policy are not permitted to communicate with each other (e.g., by honoring virtual local area networks (VLANs)).

The third exemplary ND implementation in FIG. 6A is a hybrid network device '606, which includes both custom ASICs/special-purpose OS and COTS processors/standard OS in a single ND or a single card within an ND. In certain embodiments of such a hybrid network device, a platform VM (i.e., a VM that that implements the functionality of the special-purpose network device '602) could provide for para-virtualization to the networking hardware present in the hybrid network device '606.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) '630A-R, VNEs '660A-R, and those in the hybrid network device '606) receives data on the physical NIs (e.g., '616, '646) and forwards that data out the appropriate ones of the physical NIs (e.g., '616, '646). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP), Transmission Control Protocol (TCP), and differentiated services code point (DSCP) values.

Figure 6C:
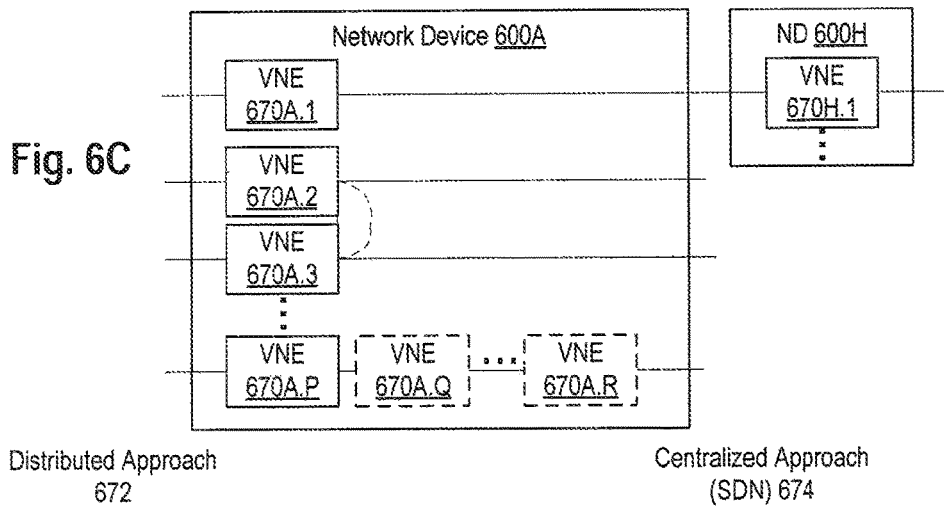
FIG. 6C illustrates various exemplary ways in which virtual network elements (VNEs) may be coupled according to some embodiments of the invention.

FIG. 6C illustrates various exemplary ways in which VNEs may be coupled according to some embodiments of the invention. FIG. 6C shows VNEs '670A.1-'670A.P (and optionally VNEs '670A.Q-'670A.R) implemented in ND '600A and VNE '670H.1 in ND '600H. In FIG. 6C, VNEs '670A.1-P are separate from each other in the sense that they can receive packets from outside ND '600A and forward packets outside of ND '600A; VNE '670A.1 is coupled with VNE '670H.1, and thus they communicate packets between their respective NDs; VNE '670A.2-'670A.3 may optionally forward packets between themselves without forwarding them outside of the ND '600A; and VNE '670A.P may optionally be the first in a chain of VNEs that includes. VNE '670A.Q followed by VNE '670A.R (this is sometimes referred to as dynamic service chaining, where each of the VNEs in the series of VNEs provides a different service—e.g., one or more layer 4-7 network services). While FIG. 6C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 6A, for example, may form part of the Internet or a private network; and other electronic devices (not shown; such as end user devices including workstations, laptops, netbooks, tablets, palm tops, mobile phones, smartphones, phablets, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 6A may also host one or more such servers (e.g., in the case of the general purpose network device '604, one or more of the software instances '662A-R may operate as servers; the same would be true for the hybrid network device '606; in the case of the special-purpose network device '602, one or more such servers could also be run on a virtualization layer executed by the processor(s) '612); in which case the servers are said to be co-located with the VNEs of that ND.

A virtual network is a logical abstraction of a physical network (such as that in FIG. 6A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network-originated attacks, to avoid malformed route announcements), and management capabilities (e.g., full detection and processing).

Figure 6D:
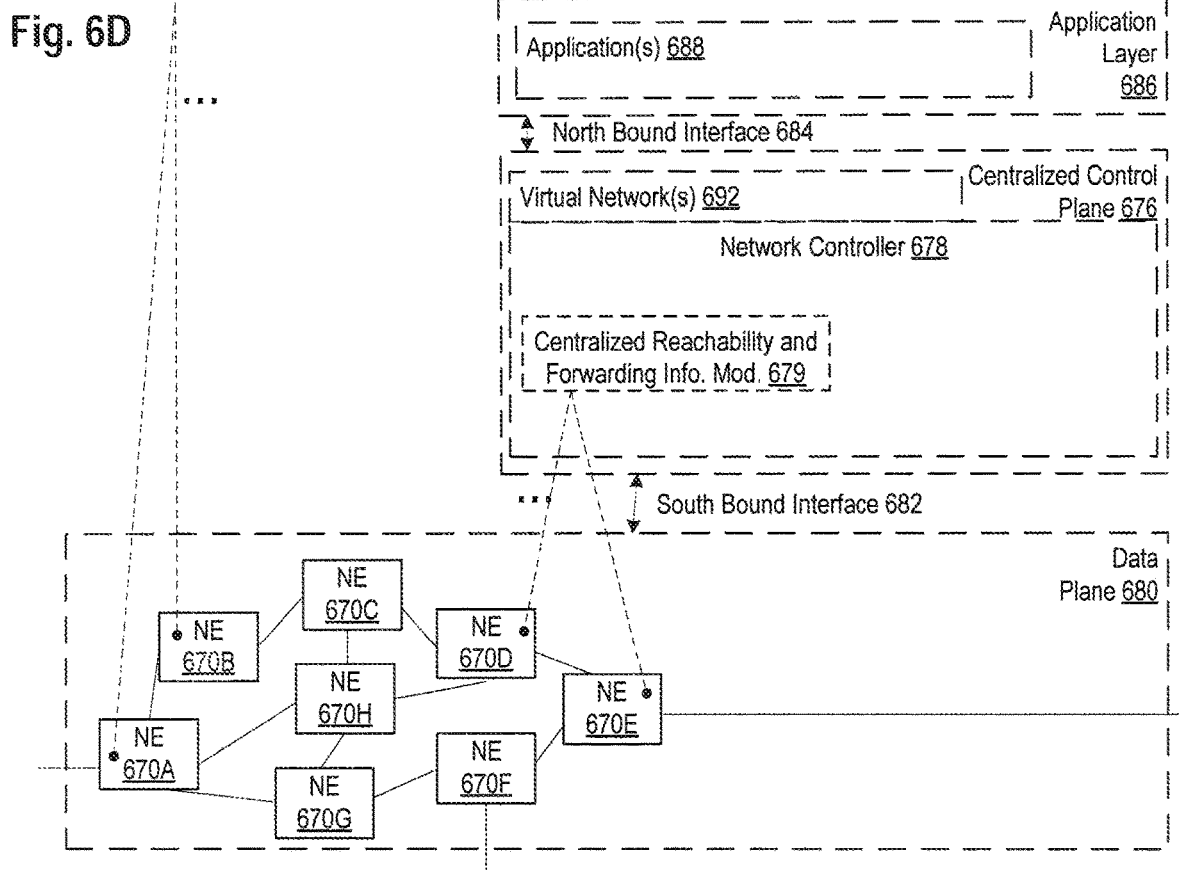
FIG. 6D illustrates a network with a single network element (NE) on each of the NDs, and within this straight forward approach contrasts a traditional distributed approach (commonly used by traditional routers) with a centralized approach for maintaining reachability and forwarding information (also called network control), according to some embodiments of the invention.

FIG. 6D illustrates a network with a single network element on each of the NDs of FIG. 6A, and within this straight forward approach contrasts a traditional distributed approach (commonly used by traditional routers) with a centralized approach for maintaining reachability and forwarding information (also called network control), according to some embodiments of the invention. Specifically, FIG. 6D illustrates network elements (NEs) '670A-H with the same connectivity as the NDs '600A-H of FIG. 6A.

FIG. 6D illustrates that the distributed approach '672 distributes responsibility for generating the reachability and forwarding information across the NEs '670A-14; in other words, the process of neighbor discovery and topology discovery is distributed.

For example, where the special-purpose network device '602 is used, the control communication and configuration module(s) '632A-R of the ND control plane '624 typically include a reachability and forwarding information module to implement one or more routing protocols (e.g., an exterior gateway protocol such as Border Gateway Protocol (BGP), Interior Gateway Protocol(s) (IGP) (e.g., Open Shortest Path First (OSPF), Intermediate System to Intermediate System (IS-IS), Routing Information Protocol (RIP), Label Distribution Protocol (LDP), Resource Reservation Protocol (RSVP) (including RSVP-Traffic Engineering (TE): Extensions to RSVP for LSP Tunnels and Generalized Multi-Protocol Label Switching (GMPLS) Signaling RSVP-TE)) that communicate with other NEs to exchange routes, and then selects those routes based on one or more routing metrics. Thus, the NEs '670A-H (e.g., the processor(s) '612 executing the control communication and configuration module(s) '632A-R) perform their responsibility for participating in controlling how data (e.g., packets) is to be routed (e.g., the next hop for the data and the outgoing physical NI for that data) by distributively determining the reachability within the network and calculating their respective forwarding information.

Routes and adjacencies are stored in one or more routing structures (e.g., Routing Information Base (RIB), Label Information Base (LIB), one or more adjacency structures) on the ND control plane '624. The ND control plane '624 programs the ND forwarding plane '626 with information (e.g., adjacency and route information) based on the routing structure(s). For example, the ND control plane '624 programs the adjacency and route information into one or more forwarding table(s) '634A-R (e.g., Forwarding Information Base (FIB), Label Forwarding Information Base (LFIB), and one or more adjacency structures) on the ND forwarding plane '626. For layer 2 forwarding, the ND can store one or more bridging tables that are used to forward data based on the layer 2 information in that data. While the above example uses the special-purpose network device '602, the same distributed approach '672 can be implemented on the general-purpose network device '604 and the hybrid network device '606.

FIG. 6D illustrates that a centralized approach '674 (also known as software defined networking (SDN)) that decouples the system that makes decisions about where traffic is sent from the underlying systems that forwards traffic to the selected destination. The illustrated centralized approach '674 has the responsibility for the generation of reachability and forwarding information in a centralized control plane '676 (sometimes referred to as a SDN control module, controller, network controller, OpenFlow controller, SDN controller, control plane node, network virtualization authority, or management control entity), and thus the process of neighbor discovery and topology discovery is centralized. The centralized control plane '676 has a south bound interface '682 with a data plane '680 (sometime referred to the infrastructure layer, network forwarding plane, or forwarding plane (which should not be confused with a ND forwarding plane)) that includes the NEs '670A-H (sometimes referred to as switches, forwarding elements, data plane elements, or nodes). The centralized control plane '676 includes a network controller '678, which includes a centralized reachability and forwarding information module '679 that determines the reachability within the network and distributes the forwarding information to the NEs '670A-H of the data plane '680 over the south bound interface '682 (which may use the OpenFlow protocol). Thus, the network intelligence is centralized in the centralized control plane '676 executing on electronic devices that are typically separate from the NDs.

For example, where the special-purpose network device '602 is used in the data plane '680, each of the control communication and configuration module(s) '632A-R of the ND control plane '624 typically include a control agent that provides the VNE side of the south bound interface '682. In this case, the ND control plane '624 (the processor(s) '612 executing the control communication and configuration module(s) '632A-R) performs its responsibility for participating in controlling how data (e.g., packets) is to be routed (e.g., the next hop for the data and the outgoing physical NI for that data) through the control agent communicating with the centralized control plane '676 to receive the forwarding information (and in some cases, the reachability information) from the centralized reachability and forwarding information module '679 (it should be understood that in some embodiments of the invention, the control communication and configuration module(s) '632A-R, in addition to communicating with the centralized control plane '676, may also play some role in determining reachability and/or calculating forwarding information—albeit less so than in the case of a distributed approach; such embodiments are generally considered to fall under the centralized approach '674, but may also be considered a hybrid approach).

While the above example uses the special-purpose network device '602, the same centralized approach '674 can be implemented with the general purpose network device '604 (e.g., each of the VNE '660A-R performs its responsibility for controlling how data (e.g., packets) is to be routed (e.g., the next hop for the data and the outgoing physical NI for that data) by communicating with the centralized control plane '676 to receive the forwarding information (and in some cases, the reachability information) from the centralized reachability and forwarding information module '679; it should be understood that in some embodiments of the invention, the VNEs '660A-R, in addition to communicating with the centralized control plane '676, may also play some role in determining reachability and/or calculating forwarding information—albeit less so than in the case of a distributed approach) and the hybrid network device '606. In fact, the use of SDN techniques can enhance the NFV techniques typically used in the general-purpose network device '604 or hybrid network device '606 implementations as NFV is able to support SDN by providing an infrastructure upon which the SDN software can be run, and NFV and SDN both aim to make use of commodity server hardware and physical switches.

FIG. 6D also shows that the centralized control plane '676 has a north bound interface '684 to an application layer '686, in which resides application(s) '688. The centralized control plane '676 has the ability to form virtual networks '692 (sometimes referred to as a logical forwarding plane, network services, or overlay networks (with the NEs '670A-H of the data plane '680 being the underlay network)) for the application(s) '688. Thus, the centralized control plane '676 maintains a global view of all NDs and configured NEs/VNEs, and it maps the virtual networks to the underlying NDs efficiently (including maintaining these mappings as the physical network changes either through hardware (ND, link, or ND component) failure, addition, or removal).

While FIG. 6D shows the distributed approach '672 separate from the centralized approach '674, the effort of network control may be distributed differently or the two combined in certain embodiments of the invention. For example: 1) embodiments may generally use the centralized approach (SDN) '674, but have certain functions delegated to the NEs (e.g., the distributed approach may be used to implement one or more of fault monitoring, performance monitoring, protection switching, and primitives for neighbor and/or topology discovery); or 2) embodiments of the invention may perform neighbor discovery and topology discovery via both the centralized control plane and the distributed protocols, and the results compared to raise exceptions where they do not agree. Such embodiments are generally considered to fall under the centralized approach '674, but may also be considered a hybrid approach.

While FIG. 6D illustrates the simple case where each of the NDs '600A-H implements a single NE '670A-H, it should be understood that the network control approaches described with reference to FIG. 6D also work for networks where one or more of the NDs '600A-H implement multiple VNEs (e.g., VNEs '630A-R, VNEs '660A-R, those in the hybrid network device '606). Alternatively or in addition, the network controller '678 may also emulate the implementation of multiple VNEs in a single ND. Specifically, instead of (or in addition to) implementing multiple VNEs in a single ND, the network controller '678 may present the implementation of a VNE/NE in a single ND as multiple VNEs in the virtual networks '692 (all in the same one of the virtual network(s) '692, each in different ones of the virtual network(s) '692, or some combination). For example, the network controller '678 may cause an ND to implement a single VNE (a NE) in the underlay network, and then logically divide up the resources of that NE within the centralized control plane '676 to present different VNEs in the virtual network(s) '692 (where these different VNEs in the overlay networks are sharing the resources of the single VNE/NE implementation on the ND in the underlay network).

Figure 6E:
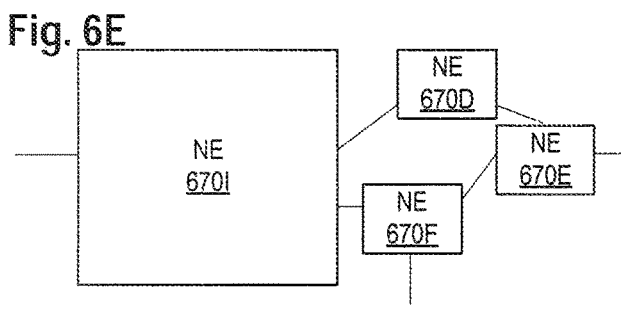
FIG. 6E illustrates the simple case of where each of the NDs implements a single NE, but a centralized control plane has abstracted multiple of the NEs in different NDs into (to represent) a single NE in one of the virtual network(s), according to some embodiments of the invention.
Figure 6F:
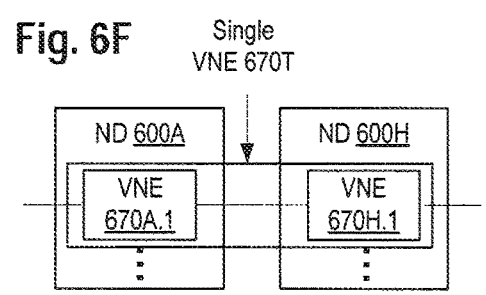
FIG. 6F illustrates a case where multiple VNEs are implemented on different NDs and are coupled to each other, and where a centralized control plane has abstracted these multiple VNEs such that they appear as a single VNE within one of the virtual networks, according to some embodiments of the invention.

On the other hand, FIGS. 6E and 6F respectively illustrate exemplary abstractions of NEs and VNEs that the network controller '678 may present as part of different ones of the virtual networks '692. FIG. 6E illustrates the simple case of where each of the NDs '600A-H implements a single NE '670A-H (see FIG. 6D), but the centralized control plane '676 has abstracted multiple of the NEs in different NDs (the NEs '670A-C and G-H) into (to represent) a single NE '6701 in one of the virtual network(s) '692 of FIG. 6D, according to some embodiments of the invention. FIG. 6E shows that in this virtual network, the NE '6701 is coupled to NE '670D and '670F, which are both still coupled to NE '670E.

FIG. 6F illustrates a case where multiple VNEs (VNE '670A.1 and VNE '670H.1) are implemented on different NDs (ND '600A and ND '600H) and are coupled to each other, and where the centralized control plane '676 has abstracted these multiple VNEs such that they appear as a single VNE '670T within one of the virtual networks '692 of FIG. 6D, according to some embodiments of the invention. Thus, the abstraction of a NE or VNE can span multiple NDs.

While some embodiments of the invention implement the centralized control plane '676 as a single entity (e.g., a single instance of software running on a single electronic device), alternative embodiments may spread the functionality across multiple entities for redundancy and/or scalability purposes (e.g., multiple instances of software running on different electronic devices).

Figure 7:
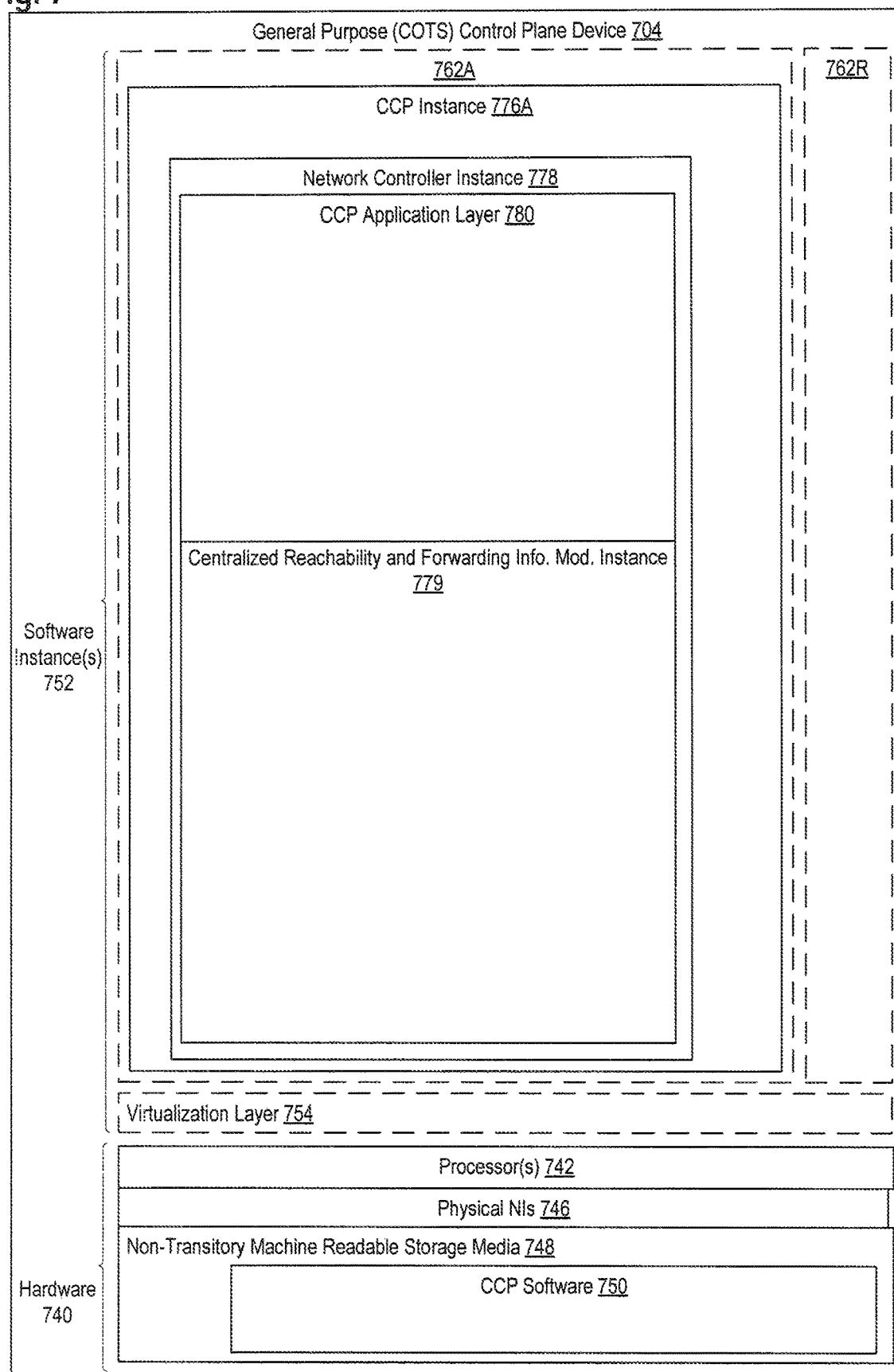
FIG. 7 illustrates a general-purpose control plane device with centralized control plane (CCP) software '750), according to some embodiments of the invention.

Similar to the network device implementations, the electronic device(s) running the centralized control plane '676, and thus the network controller '678 including the centralized reachability and forwarding information module '679, may be implemented a variety of ways (e.g., a special purpose device, a general-purpose (e.g., COTS) device, or hybrid device). These electronic device(s) would similarly include processor(s), a set or one or more physical NIs, and a non-transitory machine-readable storage medium having stored thereon the centralized control plane software. For instance, FIG. 7 illustrates, a general-purpose control plane device '704 including hardware '740 comprising a set of one or more processor(s) '742 (which are often COTS processors) and physical NIs '746, as well as non-transitory machine-readable storage media '748 having stored therein centralized control plane (CCP) software '750.

In embodiments that use compute virtualization, the processor(s) '742 typically execute software to instantiate a virtualization layer '754 (e.g., in one embodiment the virtualization layer '754 represents the kernel of an operating system (or a shim executing on a base operating system) that allows for the creation of multiple instances '762A-R called software containers (representing separate user spaces and also called virtualization engines, virtual private servers, or jails) that may each be used to execute a set of one or more applications; in another embodiment the virtualization layer '754 represents a hypervisor (sometimes referred to as a virtual machine monitor (VMM)) or a hypervisor executing on top of a host operating system, and an application is run on top of a guest operating system within an instance '762A-R called a virtual machine (which in some cases may be considered a tightly isolated form of software container) that is run by the hypervisor; in another embodiment, an application is implemented as a unikernel, which can be generated by compiling directly with an application only a limited set of libraries (e.g., from a library operating system (LibOS) including, drivers/libraries of OS services) that provide the particular OS services needed by the application, and the unikernel can run directly on hardware '740, directly on a hypervisor represented by virtualization layer '754 (in which case the unikernel is sometimes described as running within a LibOS virtual machine), or in a software container represented by one of instances '762A-R). Again, in embodiments where compute virtualization is used, during operation an instance of the CCP software '750 (illustrated as CCP instance '776A) is executed (e.g., within the instance '762A) on the virtualization layer '754. In embodiments where compute virtualization is not used, the CCP instance '776A is executed, as a unikernel or on top of a host operating system, on the "bare metal" general purpose control plane device '704. The instantiation of the CCP instance '776A, as well as the virtualization layer '754 and instances '762A-R if implemented, are collectively referred to as software instance(s) '752.

In some embodiments, the CCP instance '776A includes a network controller instance '778. The network controller instance '778 includes a centralized reachability and forwarding information module instance '779 (which is a middleware layer providing the context of the network controller '678 to the operating system and communicating with the various NEs), and an CCP application layer '780 (sometimes referred to as an application layer) over the middleware layer (providing the intelligence required for various network operations such as protocols, network situational awareness, and user—interfaces). At a more abstract level, this CCP application layer '780 within the centralized control plane '676 works with virtual network view(s) (logical view(s) of the network) and the middleware layer provides the conversion from the virtual networks to the physical view.

The centralized control plane '676 transmits relevant messages to the data plane '680 based on CCP application layer '780 calculations and middleware layer mapping, for each flow. A flow may be defined as a set of packets whose headers match a given pattern of bits; in this sense, traditional IP forwarding is also flow-based forwarding where the flows are defined by the destination IP address for example; however, in other implementations, the given pattern of bits used for a flow definition may include more fields (e.g., 10 or more) in the packet headers. Different NDs/NEs/VNEs of the data plane '680 may receive different messages, and thus different forwarding information. The data plane '680 processes these messages and programs the appropriate flow information and corresponding actions in the forwarding tables (sometime referred to as flow tables) of the appropriate NE/VNEs, and then the NEs/VNEs map incoming packets to flows represented in the forwarding tables and forward packets based on the matches in the forwarding tables.

Standards such as OpenFlow define the protocols used for the messages, as well as a model for processing the packets. The model for processing packets includes header parsing, packet classification, and making forwarding decisions. Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

Packet classification involves executing a lookup in memory to classify the packet by determining which entry (also referred to as a forwarding table entry or flow entry) in the forwarding tables best matches the packet based upon the match structure, or key, of the forwarding table entries. It is possible that many flows represented in the forwarding table entries can correspond/match to a packet; in this case the system is typically configured to determine one forwarding table entry from the many according to a defined scheme (e.g., selecting a first forwarding table entry that is matched). Forwarding table entries include both a specific set of match criteria (a set of values or wildcards, or an indication of what portions of a packet should be compared to a particular value/values/wildcards, as defined by the matching capabilities—for specific fields in the packet header, or for some other packet content), and a set of one or more actions for the data plane to take on receiving a matching packet. For example, an action may be to push a header onto the packet, for the packet using a particular port, flood the packet, or simply drop the packet. Thus, a forwarding table entry for IPv4/IPv6 packets with a particular transmission control protocol (TCP) destination port could contain an action specifying that these packets should be dropped.

Making forwarding decisions and performing actions occurs, based upon the forwarding table entry identified during packet classification, by executing the set of actions identified in the matched forwarding table entry on the packet.

However, when an unknown packet (for example, a "missed packet" or a "match-miss" as used in OpenFlow parlance) arrives at the data plane '680, the packet (or a subset of the packet header and content) is typically forwarded to the centralized control plane '676. The centralized control plane '676 will then program forwarding table entries into the data plane '680 to accommodate packets belonging to the flow of the unknown packet. Once a specific forwarding table entry has been programmed into the data plane '680 by the centralized control plane '676, the next packet with matching credentials will match that forwarding table entry and take the set of actions associated with that matched entry.

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method in a network device that is communicatively coupled with a plurality of network devices and the network device is operative to act as a route reflector for the plurality of network devices, the method comprising:
  receiving a first media access control (MAC)/Internet Protocol (IP) route for a customer network device;
  installing the first MAC/IP route in a MAC/IP routing table as a best route for reaching the customer network device;
  transmitting the first MAC/IP route to a first subset of the plurality of network devices causing each one of the first subset of the plurality of network devices to install the route as a best route for the customer network device;
  receiving a second MAC/IP route for the customer network device and a sequence number for the second MAC/IP route, the second MAC/IP route being different than the first MAC/IP route, and the sequence number being indicative of an order of advertisement of the second MAC/IP route for the customer network device when compared with advertisement of other MAC/IP routes for the customer network device, the sequence number indicating that the second MAC/IP route is advertised by a network device that has a MAC/IP route already installed for the customer network device;

determining, based on the sequence number, that the second MAC/IP route is a best route for the customer network device;

installing the second MAC/IP route as the best route for the customer network device; and transmitting the second MAC/IP route to a second subset of the plurality of network devices including a first network device from which the first MAC/IP route originated, causing the first network device to request withdrawal of the first MAC/IP route, requesting withdrawal of the first MAC/IP route including transmitting a withdraw MAC/IP route advertisement for the first MAC/IP route causing each one of the first subset of the plurality of network devices to remove the first MAC/IP route from a respective MAC/IP routing table.

2. The method of claim 1, wherein the determining, based on the sequence number that the second MAC/IP route is the best route for the customer network device includes:

determining whether the first MAC/IP route is associated with a first sequence number that is indicative of an order of advertisement of the first MAC/IP route for the customer network device when compared with advertisements of other routes for the customer network device; and responsive to determining that the first MAC/IP route is not associated with the first sequence number, selecting the second MAC/IP route as the best route for the customer network device.

3. The method of claim 2, wherein the sequence number is a second sequence number, and wherein the determining, based on the sequence number that the second MAC/IP route is the best route for the customer network device further includes:

responsive to determining that the first MAC/IP route is associated with the first sequence number, performing the following:

determining whether the second sequence number is greater than the first sequence number; and responsive to determining that the second sequence number is greater than the first sequence number, selecting the second MAC/IP route as the best route for the customer network device.

4. The method of claim 1 further comprising: receiving the withdraw MAC/IP route advertisement for the first MAC/IP route; and responsive to receiving the withdraw MAC/IP route advertisement for the first MAC/IP route, removing the first MAC/IP route from the MAC/IP routing table.

5. The method of claim 1, wherein the receiving the first MAC/IP route includes receiving, from the first network device, a first border gateway protocol (BGP) MAC/IP route advertisement including the first MAC/IP route, and the receiving the second MAC/IP route includes receiving from a second network device that is different from the first network device, a second BGP MAC/IP route advertisement including the second MAC/IP route.

6. The method of claim 5, wherein the sequence number is included in a BGP MAC mobility extended community attribute of the second BGP MAC/IP route advertisement.

7. A machine-readable medium comprising computer program code which when executed by a computer carries out the method steps of claim 1.

8. A network device that is to be communicatively coupled with a plurality of network devices and the network device is operative to act as a route reflector for the plurality of network devices, the network device comprising:

one or more processors; and a non-transitory machine-readable storage medium that provides instructions that, when executed by the one or more processors, will cause the network device to:

receive a first media access control (MAC)/Internet Protocol (IP) route for a customer network device, install the first MAC/IP route in a MAC/IP routing table as a best route for reaching the customer network device, transmit the first MAC/IP route to a first subset of the plurality of network devices causing each one of the first subset of the plurality of network devices to install the route as a best route for the customer network device, receive a second MAC/IP route for the customer network device and a sequence number for the second MAC/IP route, the second MAC/IP route being different than the first MAC/IP route, and the sequence number being indicative of an order of advertisement of the second MAC/IP route for the customer network device when compared with advertisement of other MAC/IP routes for the customer network device, determine based on the sequence number, that the second MAC/IP route is a best route for the customer network device, the sequence number indicating that the second MAC/IP route is advertised by a network device that has a MAC/IP route already installed for the customer network device, install the second MAC/IP route as the best route for the customer network device, and transmit the second MAC/IP route to a second subset of the plurality of network devices including a first network device from which the first MAC/IP route originated, causing the first network device to request withdrawal of the first MAC/IP route, requesting withdrawal of the first MAC/IP route including transmitting a withdraw MAC/IP route advertisement for the first MAC/IP route causing each one of the first subset of the plurality of network devices to remove the first MAC/IP route from a respective MAC/IP routing table.

9. The network device of claim 8, wherein the sequence number is a second sequence number, and wherein to determine, based on the sequence number that the second MAC/IP route is the best route for the customer network device includes to:

determine whether the first MAC/IP route is associated with a first sequence number that is indicative of an order of advertisement of the first MAC/IP route for the customer network device when compared with advertisements of other routes for the customer network device; and responsive to determining that the first MAC/IP route is not associated with the first sequence number, select the second MAC/IP route as the best route for the customer network device.

10. The network device of claim 9, wherein to determine, based on the sequence number that the second MAC/IP route is the best route for the customer network device further includes to:

responsive to determining that the first MAC/IP route is associated with the first sequence number, perform the following:

determine whether the second sequence number is greater than the first sequence number; and responsive to determining that the second sequence number is greater than the first sequence number, select the second MAC/IP route as the best route for the customer network device.

11. The network device of claim 8, wherein the instructions when executed by the one or more processors, will further cause the network device to:

receive the withdraw MAC/IP route advertisement for the first MAC/IP route; and responsive to receiving the withdraw MAC/IP route advertisement for the first MAC/IP route, remove the first MAC/IP route from the MAC/IP routing table.

12. The network device of claim 8, wherein to receive the first MAC/IP route includes to receive, from the first network device, a first border gateway protocol (BGP) MAC/IP route advertisement including the first MAC/IP route, and to receive the second MAC/IP route includes to receive from a second network device that is different from the first network device, a second BGP MAC/IP route advertisement including the second MAC/IP route.

13. The network device of claim 12, wherein the sequence number is included in a BGP MAC mobility extended community attribute of the second BGP MAC/IP route advertisement.

* * * * *